US012767202B2

(12) United States Patent
Zhang

(10) Patent No.: US 12,767,202 B2
(45) Date of Patent: Oct. 20, 2026

(54) WAGON WITH HEIGHT REDUCED AFTER BEING FOLDED

(71) Applicant: Jinhua Mutao Leisure Products Co., Ltd., Jinhua (CN)

(72) Inventor: Xiangshan Zhang, Suzhou (CN)

(73) Assignee: Jinhua Mutao Leisure Products Co., Ltd., Jinhua (CN)

( * ) Notice: Subject to any disclaimer, the term of this patent is extended or adjusted under 35 U.S.C. 154(b) by 237 days.

(21) Appl. No.: 18/912,559

(22) Filed: Oct. 10, 2024

(65) Prior Publication Data

US 2026/0054760 A1 Feb. 26, 2026

(30) Foreign Application Priority Data

Aug. 20, 2024 (CN) ......................... 202411144938.0
Aug. 20, 2024 (CN) ......................... 202422021142.8

(51) Int. Cl.
*B62B 3/00* (2006.01)
*B62B 3/02* (2006.01)
*B62B 5/06* (2006.01)

(52) U.S. Cl.
CPC .............. *B62B 3/007* (2013.01); *B62B 3/025* (2013.01); *B62B 5/065* (2013.01); *B62B 2205/06* (2013.01)

(58) Field of Classification Search
CPC ......... B62B 3/007; B62B 3/025; B62B 5/065; B62B 2205/06; B62B 2205/003; B62B 2206/06
See application file for complete search history.

(56) References Cited

U.S. PATENT DOCUMENTS

| | | | | |
|---|---|---|---|---|
| 8,011,686 | B2 * | 9/2011 | Chen | B62B 3/106 280/87.01 |
| 9,085,311 | B1 * | 7/2015 | Chen | B62B 3/001 |
| 9,145,154 | B1 * | 9/2015 | Horowitz | B62B 5/0013 |
| 9,738,298 | B1 * | 8/2017 | Yang | B62B 3/025 |
| 9,956,981 | B1 * | 5/2018 | Fitzwater | E04H 15/06 |
| 10,040,470 | B1 * | 8/2018 | Horowitz | B62B 3/102 |
| D929,063 | S * | 8/2021 | Zhang | D34/12 |
| 11,332,178 | B2 * | 5/2022 | Yang | B62B 5/067 |
| 11,370,467 | B1 * | 6/2022 | Horowitz | B62B 3/007 |

(Continued)

FOREIGN PATENT DOCUMENTS

CN 219857191 U * 10/2023

*Primary Examiner* — Jacob B Meyer
(74) *Attorney, Agent, or Firm* — Bayramoglu Law Offices LLC

(57) ABSTRACT

A wagon with a height reduced after being folded includes four telescopic standing posts arranged in a rectangle pattern and at intervals, and at least two side folding mechanisms arranged opposite to each other. Two ends of the side folding mechanism are respectively hinged to two adjacent telescopic standing posts. When the wagon is folded, the side folding mechanisms drive the telescopic standing posts connected thereto to retract and shorten. When the wagon is unfolded, the side folding mechanisms drive the telescopic standing posts connected thereto to extend. The wagon has a height in a folded state smaller than a height thereof in an unfolded state. When the wagon is folded or unfolded, the folding mechanisms drive the telescopic standing posts to retract or extend. Therefore, after the wagon is unfolded, the space for a fabric bed provided on tops of the telescopic standing posts is increased.

16 Claims, 13 Drawing Sheets

(56) References Cited

U.S. PATENT DOCUMENTS

| | | | | | |
|---|---|---|---|---|---|
| 11,577,766 | B2 * | 2/2023 | Horowitz | B62B 5/065 |
| 11,685,416 | B2 * | 6/2023 | Yang | B62B 3/002 280/651 |
| 11,851,097 | B2 * | 12/2023 | Chu | B62B 5/067 |
| D1,041,116 | S * | 9/2024 | Zhang | D34/12 |
| 12,157,512 | B1 * | 12/2024 | Jiang | B62B 3/02 |
| D1,057,032 | S * | 1/2025 | Zhou | D34/12 |
| D1,059,721 | S * | 1/2025 | Ying | D34/17 |
| 12,296,882 | B1 * | 5/2025 | Wu | B62B 3/025 |
| 12,304,544 | B2 * | 5/2025 | Conn | B62B 5/067 |
| 12,434,752 | B2 * | 10/2025 | Zhou | B62B 3/007 |
| 12,491,922 | B1 * | 12/2025 | Qiao | B62B 3/007 |
| 12,515,727 | B2 * | 1/2026 | Zhang | B62B 3/02 |
| 12,679,434 | B2 * | 7/2026 | Zhang | B62B 3/007 |
| 2024/0124040 | A1 * | 4/2024 | Conn | B62B 5/067 |
| 2025/0065934 | A1 * | 2/2025 | Zhang | B62B 3/007 |
| 2026/0008489 | A1 * | 1/2026 | Zhang | B62B 3/007 |
| 2026/0054760 | A1 * | 2/2026 | Zhang | B62B 3/007 |

* cited by examiner

WAGON WITH HEIGHT REDUCED AFTER BEING FOLDED

CROSS REFERENCE TO THE RELATED APPLICATIONS

This application is based upon and claims priority to Chinese Patent Applications No. 202422021142.8 and No. 202411144938.0, both filed on Aug. 20, 2024, the entire contents of which are incorporated herein by reference.

TECHNICAL FIELD

The present disclosure relates to the technical field of wagons, and in particular to a wagon with a height reduced after being folded.

BACKGROUND

In daily life and production, it is often necessary to use wagons to transport luggage or items. Wagons are widely used because they are convenient, time-saving, and effortless to push. Collapsible wagons are designed for easy storage. Collapsible wagons are lightweight and can be placed on the vehicle after being folded, making them easy to carry.

However, the existing collapsible wagon has a small capacity after being unfolded, only to store a small number of items, and has a large volume and takes up a lot of space after being folded. It is especially inconvenient to fold and store the collapsible wagon in a space-limited area such as a car trunk, seriously affecting the user experience.

Due to the structural limitation of the folding mechanism itself, the height of the traditional wagon in the folded state is significantly greater than its height in the unfolded state, which results in a large area occupied by the wagon during storage. If the consideration is only given to reducing the area occupied by the wagon during storage, it will inevitably sacrifice the capacity of the wagon in the unfolded state. Therefore, the capacity of the wagon in the unfolded state and the area occupied by the wagon during storage are mutually constrained, which is a difficult issue studied by technical personnel in this art.

SUMMARY

(I) Technical Problem to Be Solved

In view of the above defects and shortcomings of the prior art, the present disclosure provides a wagon with a height reduced after being folded. The present disclosure solves the technical problem that the existing collapsible wagon has a small unfolded capacity and a large folded volume.

(II) Technical Solution

In order to achieve the above objective, the present disclosure provides a wagon with a height reduced after being folded. The wagon with the height reduced after being folded includes four telescopic standing posts arranged in a rectangle pattern and at intervals, and at least two side folding mechanisms arranged opposite to each other, where two ends of the side folding mechanism are respectively hinged to two adjacent telescopic standing posts; and when the wagon with the height reduced after being folded is folded, the side folding mechanisms drive the telescopic standing posts connected thereto to retract and shorten;

when the wagon with the height reduced after being folded is unfolded, the side folding mechanisms drive the telescopic standing posts connected thereto to extend; and the wagon with the height reduced after being folded has a height in a folded state smaller than a height thereof in an unfolded state.

Optionally, the telescopic standing post includes a lifting rod;

- a top of the lifting rod forms a top of the telescopic standing post; the two ends of the side folding mechanism are provided with linkage ends that are hinged to the lifting rods of the corresponding telescopic standing posts;
- when the wagon with the height reduced after being folded is folded, a length of the side folding mechanism is reduced, and the linkage ends drive the lifting rods to move downward;
- when the wagon with the height reduced after being folded is unfolded, the length of the side folding mechanism is increased, and the linkage ends drive the lifting rods to move upward; and
- a height of the side folding mechanism after being folded is smaller than a height of the telescopic standing post.

Optionally, the telescopic standing post further includes a fixed vertical rod;

- the lifting rod is slidable vertically relative to the fixed vertical rod;
- the two ends of the side folding mechanism are further provided with fixed ends; and the fixed ends are hinged to the fixed vertical rods of the corresponding telescopic standing posts; and
- when the side folding mechanism is folded or unfolded, the fixed end rotates, and the linkage end drives the lifting rod to move along the fixed vertical rod.

Optionally, a linkage sliding sleeve is slidably provided on the fixed vertical rod;

- the lifting rod is connected to the linkage sliding sleeve, and the linkage end is hinged to the linkage sliding sleeve;
- a top of the fixed vertical rod is provided with a top fixing element, and the fixed end is hinged to the top fixing element;
- when the wagon with the height reduced after being folded is folded, the linkage end hinged to the linkage sliding sleeve drives the lifting rod to move downward through the linkage sliding sleeve; and
- when the wagon with the height reduced after being folded is unfolded, the linkage end hinged to the linkage sliding sleeve drives the lifting rod to move upward through the linkage sliding sleeve.

Optionally, the lifting rod is located outside the fixed vertical rod and slidably connected to the top fixing element; and when the lifting rod moves up and down, the top fixing element limits the lifting rod laterally; and

- alternatively, the fixed vertical rod is a hollow structure, and the lifting rod is slidably nested inside the fixed vertical rod; the linkage sliding sleeve is slidably sleeved outside the fixed vertical rod; the fixed vertical rod is provided with a vertical slot hole; the lifting rod is connected to the linkage sliding sleeve through a connecting element; and when the lifting rod moves up and down, the fixed vertical rod limits the lifting rod laterally.

Optionally, the wagon with the height reduced after being folded includes four side folding mechanisms located at front, rear, left and right sides; the side folding mechanisms located at the left and right sides are constructed in a first or second structure; and the side folding mechanisms located at the front and rear sides are constructed in the first structure;

in the first structure:

the first structure includes a plurality of X-shaped rod sets that are sequentially hinged; and the X-shaped rod set includes a first connecting rod and a second connecting rod that are hinged in a central part;

in the side folding mechanism, as for an X-shaped rod set located at a head end, a first end of the first connecting rod forms the fixed end, and a first end of the second connecting rod forms the linkage end;

as for an X-shaped rod set located at a tail end, a first end of the first connecting rod forms the fixed end, and a first end of the second connecting rod forms the linkage end; and in the X-shaped rod set, the first end of the first connecting rod and the first end of the second connecting rod are located at a same side;

in the second structure:

the second structure includes a first crossing rod and a second crossing rod located at one end, a third crossing rod and a fourth crossing rod located at the other end, and a T-shaped folding assembly located in a central position;

the first crossing rod and the second crossing rod are hinged in a central part, and the third crossing rod and the fourth crossing rod are hinged in a central part;

a first end of the first crossing rod forms the fixed end, and a first end of the second crossing rod forms the linkage end; and the first end of the first crossing rod and the first end of the second crossing rod are located at a same side;

a first end of the third crossing rod forms the fixed end, and a first end of the fourth crossing rod forms the linkage end; and the first end of the third crossing rod and the first end of the fourth crossing rod are located at a same side;

the T-shaped folding assembly includes a fifth crossing rod, a sixth crossing rod, and a seventh crossing rod;

a first end of the fifth crossing rod is hinged to a second end of the second crossing rod, and a first end of the sixth crossing rod is hinged to a second end of the fourth crossing rod;

a second end of the fifth crossing rod is hinged to a second end of the sixth crossing rod;

a hinge portion between the fifth crossing rod and the sixth crossing rod is connected to a first end of the seventh crossing rod; and second ends of the first crossing rod and the third crossing rod are hinged to a second end of the seventh crossing rod; and in the first structure and the second structure, when the wagon with the height reduced after being folded is folded, the fixed end and the linkage end located at the same side move away from each other; and when the wagon with the height reduced after being folded is unfolded, the fixed end and the linkage end located at the same side approach each other.

Optionally, adjacent fixed ends of each two adjacent side folding mechanisms are connected to a same top fixing element, and adjacent linkage ends of each two adjacent side folding mechanisms are connected to a same linkage sliding sleeve.

Optionally, the wagon with the height reduced after being folded further includes a bottom support mechanism; the bottom support mechanism is hinged between the four telescopic standing posts; a set of side folding mechanisms arranged opposite to each other are connected to the bottom support mechanism through a first connecting assembly and a second connecting assembly, respectively; and the bottom support mechanism is foldable, and a height of the bottom support mechanism after being folded is smaller than a height of the telescopic standing post;

the wagon with the height reduced after being folded further includes a handle mechanism; the handle mechanism includes a telescopic rod, a first crossbar, and a second crossbar; first ends of the first crossbar and the second crossbar are hinged to the telescopic rod, and second ends of the first crossbar and the second crossbar are respectively rotatably connected at a limited angle to lower ends of two adjacent telescopic standing posts; the telescopic rod is configured to extend and retract in one-to-one correspondence; and a height of the telescopic rod in a retraction state is smaller than the height of the telescopic standing post; and lower ends of the four telescopic standing posts are provided with casters, and at least one pair of casters are universal wheels.

Optionally, the bottom support mechanism includes a first bottom connector and a second bottom connector; the first connecting assembly is provided with a third bottom connector; and the second connecting assembly is provided with a fourth bottom connector;

the first bottom connector is rotatably connected at a limited angle to the lower ends of two adjacent telescopic standing posts through first bottom connecting rods;

the second bottom connector is rotatably connected at a limited angle to the lower ends of other two adjacent telescopic standing posts through second bottom connecting rods;

the first bottom connector is rotatably connected at a limited angle to the third bottom connector and the fourth bottom connector through third bottom connecting rods;

the second bottom connector is rotatably connected at a limited angle to the third bottom connector and the fourth bottom connector through fourth bottom connecting rods; and when the wagon with the height reduced after being folded is in the folded state, heights of the first bottom connector and the second bottom connector are smaller than the height of the telescopic standing post.

Optionally, top ends of the four telescopic standing posts are respectively connected to four corners of a fabric bed of the wagon with the height reduced after being folded in one-to-one correspondence.

(III) Beneficial Effects

When the wagon with the height reduced after being folded is folded, the side folding mechanisms drive the telescopic standing posts connected thereto to retract and shorten. Therefore, in the folding process, the telescopic standing posts automatically retract and shorten. When the wagon with the height reduced after being folded is unfolded, the side folding mechanisms drive the telescopic standing posts connected thereto to extend. Therefore, in the unfolding process, the telescopic standing posts automatically extend. The wagon is easy to operate and convenient for users to use.

The unfolded capacity and folded volume of the wagon are changed by the telescopic standing posts. In the unfolding process, the telescopic standing posts extend, increasing the height of the wagon unfolded and thereby increasing the internal capacity of the wagon. In the folding process, the telescopic standing posts retract and shorten, reducing the overall height of the wagon with the height reduced after being folded, and reducing the space occupied by the wagon, making it easy to carry and transport.

REFERENCE NUMERALS

1. telescopic standing post; 11. first telescopic standing post; 12. second telescopic standing post; 13. third telescopic standing post; 14. fourth telescopic standing post; 15. linkage sliding sleeve; 16. top fixing element; and 17. slot hole;

111. first lifting rod; and 112. first fixed vertical rod;

121. second lifting rod; and 122. second fixed vertical rod;

131. third lifting rod; and 132. third fixed vertical rod;

141. fourth lifting rod; and 142. fourth fixed vertical rod;

2. side folding mechanism; 21. first folding mechanism; 22. second folding mechanism; 23. third folding mechanism; and 24. fourth folding mechanism;

201. linkage end; and 202. fixed end;

211. first X-shaped rod set; 212. second X-shaped rod set; 213. third X-shaped rod set; 214. fourth X-shaped rod set; and 215. fifth X-shaped rod set;

2111. first connecting rod; and 2112. second connecting rod;

2121. third connecting rod; and 2122. fourth connecting rod;

231. first crossing rod; 232. second crossing rod; 233. third crossing rod; 234. fourth crossing rod; 235. fifth crossing rod; 236. sixth crossing rod; and 237. seventh crossing rod;

25. first connecting assembly; 26. second connecting assembly; 251. first suspension rod; and 261. second suspension rod;

3. bottom support mechanism; 31. first bottom connector; 32. second bottom connector; 33. third bottom connector; 34. fourth bottom connector; 35. first bottom connecting rod; 36. second bottom connecting rod; 37. third bottom connecting rod; and 38. fourth bottom connecting rod;

4. handle mechanism; 41. telescopic rod; 42. first crossbar; and 43. second crossbar; and

5. caster.

DETAILED DESCRIPTION OF THE EMBODIMENTS

To facilitate a better understanding of the present disclosure, the present disclosure is described in detail below with reference to the drawings and specific embodiments.

Although the drawings show exemplary embodiments of the present disclosure, it should be understood that the present disclosure may be implemented in various forms and should not be limited to the embodiments set forth herein. The embodiments are provided for a more thorough understanding of the present disclosure, so as to make the scope of the present disclosure be fully conveyed to those skilled in the art.

Figure 1:
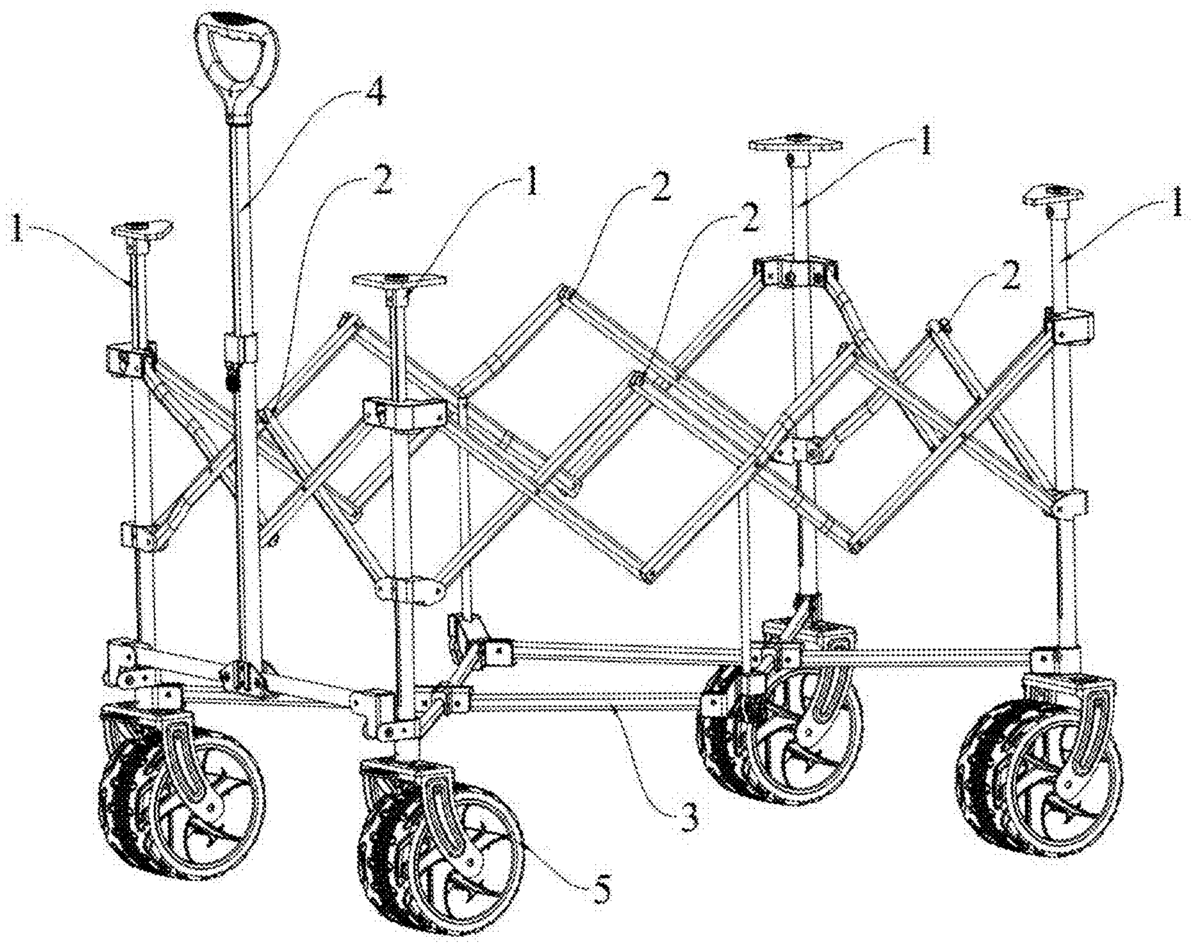
FIG. 1 is a three-dimensional schematic diagram of a first structure of a wagon with a height reduced after being folded according to the present disclosure.
Figure 2:
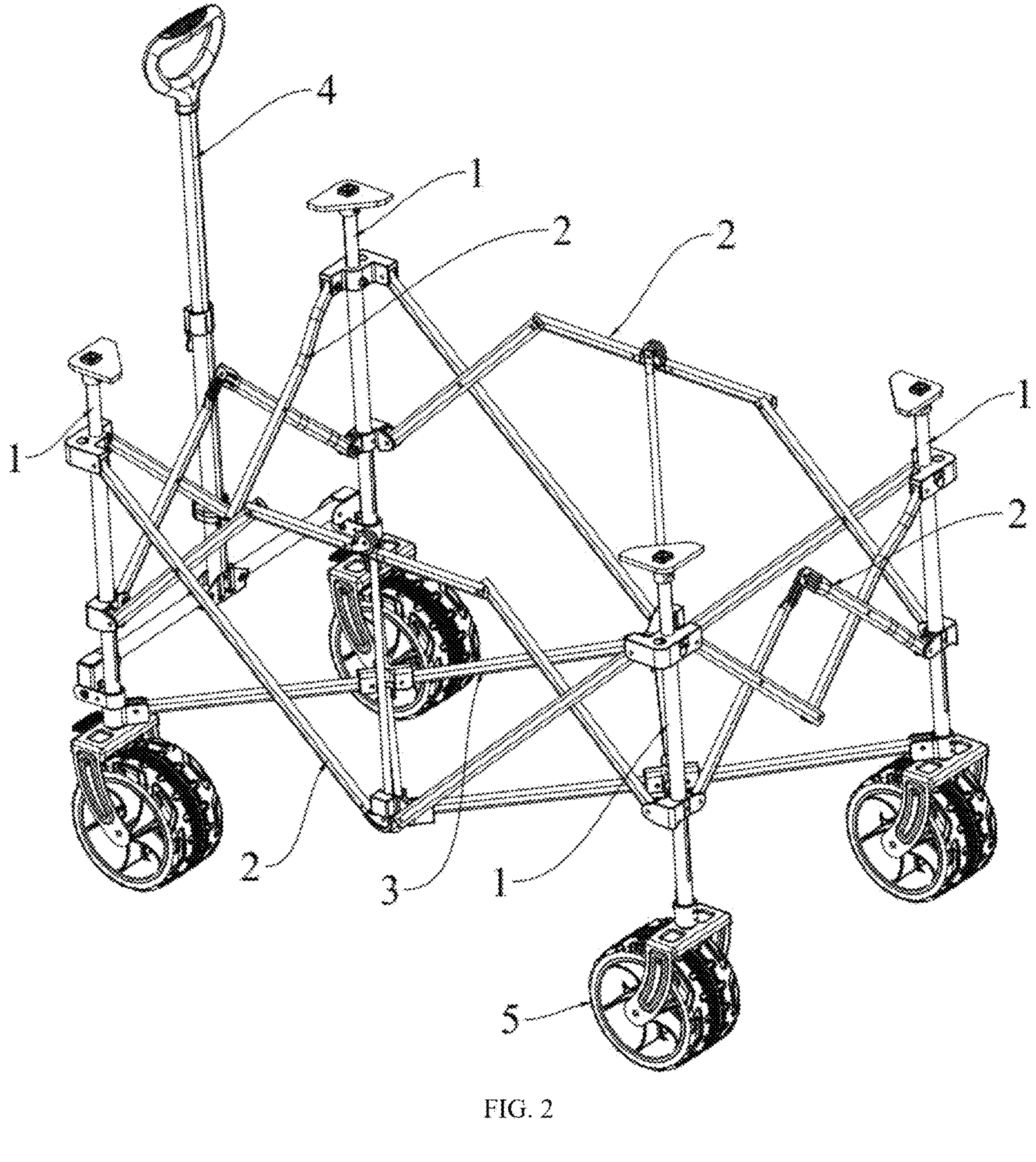
FIG. 2 is a three-dimensional schematic diagram of a second structure of the wagon with the height reduced after being folded according to the present disclosure.

As shown in FIGS. 1 and 2, the present disclosure provides a wagon with a height reduced after being folded, where a height of the wagon in a folded state is smaller than a height thereof in an unfolded state.

Figure 3:
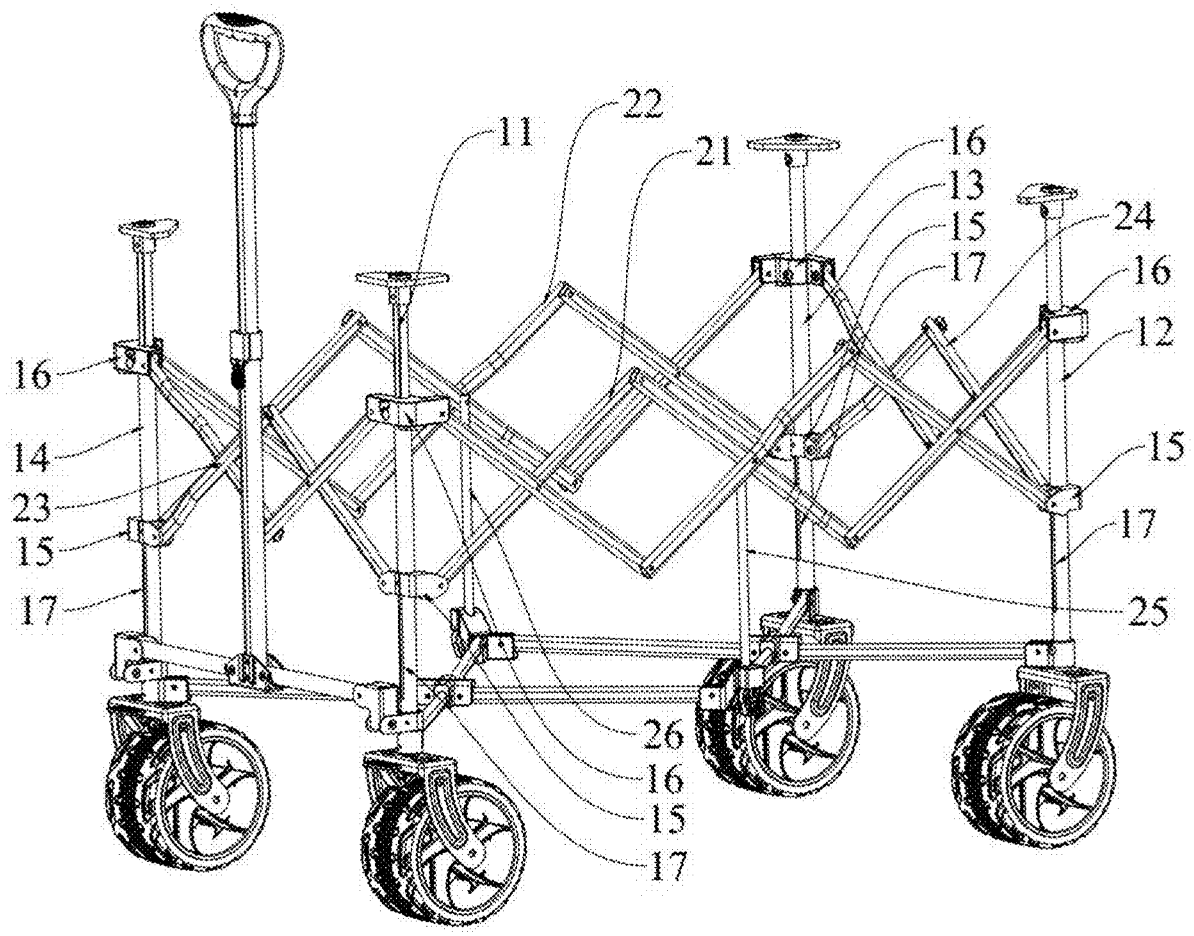
FIG. 3 is a connection diagram of side folding mechanisms in a first embodiment of the wagon with the height reduced after being folded according to the present disclosure.

As shown in FIGS. 1 to 3, the wagon with the height reduced after being folded includes four telescopic standing posts 1 arranged in a rectangle pattern and at intervals, and at least two side folding mechanisms 2 arranged opposite to each other. The side folding mechanisms 2 of the wagon with the height reduced after being folded include three forms. In a first form, one side folding mechanism 2 is provided at each of left and right sides. In a second form, one side folding mechanism 2 is provided at each of front and rear sides. In a third form, one side folding mechanism 2 is provided at each of the front, rear, left and right sides. For ease of description, the left side folding mechanism 2 is defined as first folding mechanism 21, the right side folding mechanism 2 is defined as second folding mechanism 22, the front side folding mechanism 2 is defined as third folding mechanism 23, and the rear side folding mechanism 2 is defined as fourth folding mechanism 24. The first folding mechanism 21 and the second folding mechanism 22 are two opposing side folding mechanisms 2, while the third folding mechanism 23 and the fourth folding mechanism 24 are two opposing side folding mechanisms 2. The four telescopic standing posts 1 arranged in a rectangle pattern and at intervals include first telescopic standing post 11, second telescopic standing post 12, third telescopic standing post 13, and fourth telescopic standing post 14, respectively.

When the side folding mechanisms 2 are in the first form, the first folding mechanism 21 is hinged between the first telescopic standing post 11 and the second telescopic standing post 12, while the second folding mechanism 22 is hinged between the third telescopic standing post 13 and the fourth telescopic standing post 14. When the side folding mechanisms 2 are in the second form, the third folding mechanism 23 is hinged between the first telescopic standing post 11 and the fourth telescopic standing post 14, while the fourth folding mechanism 24 is hinged between the second telescopic standing post 12 and the third telescopic standing post 13. When the side folding mechanisms 2 are in the third form, the connection methods of the four side folding mechanisms 2 include the connection methods in the first form and the second form.

Figure 12:
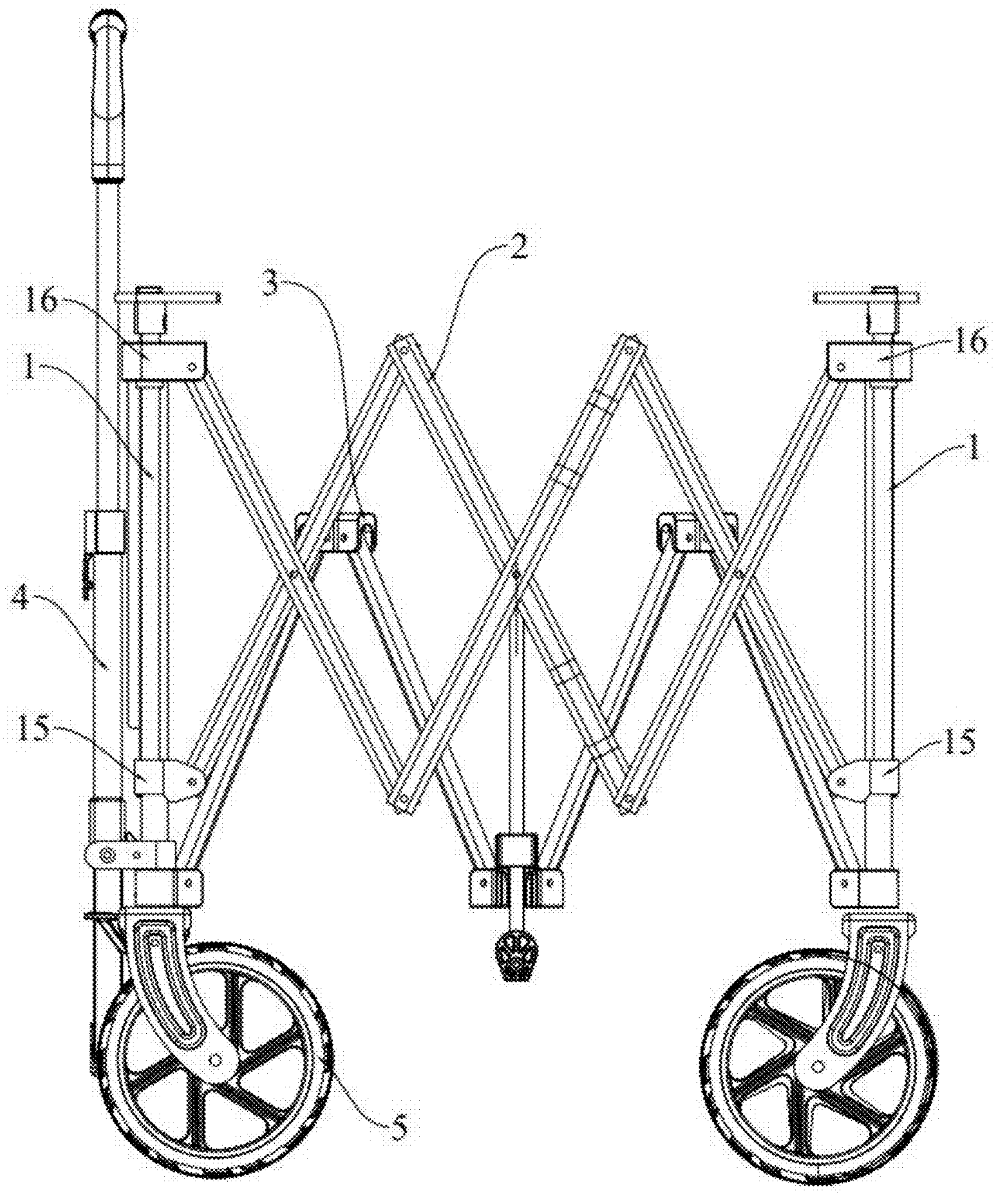
FIG. 12 is a schematic diagram of the wagon with the height reduced after being folded in a half-folded state according to the present disclosure.
Figure 13:
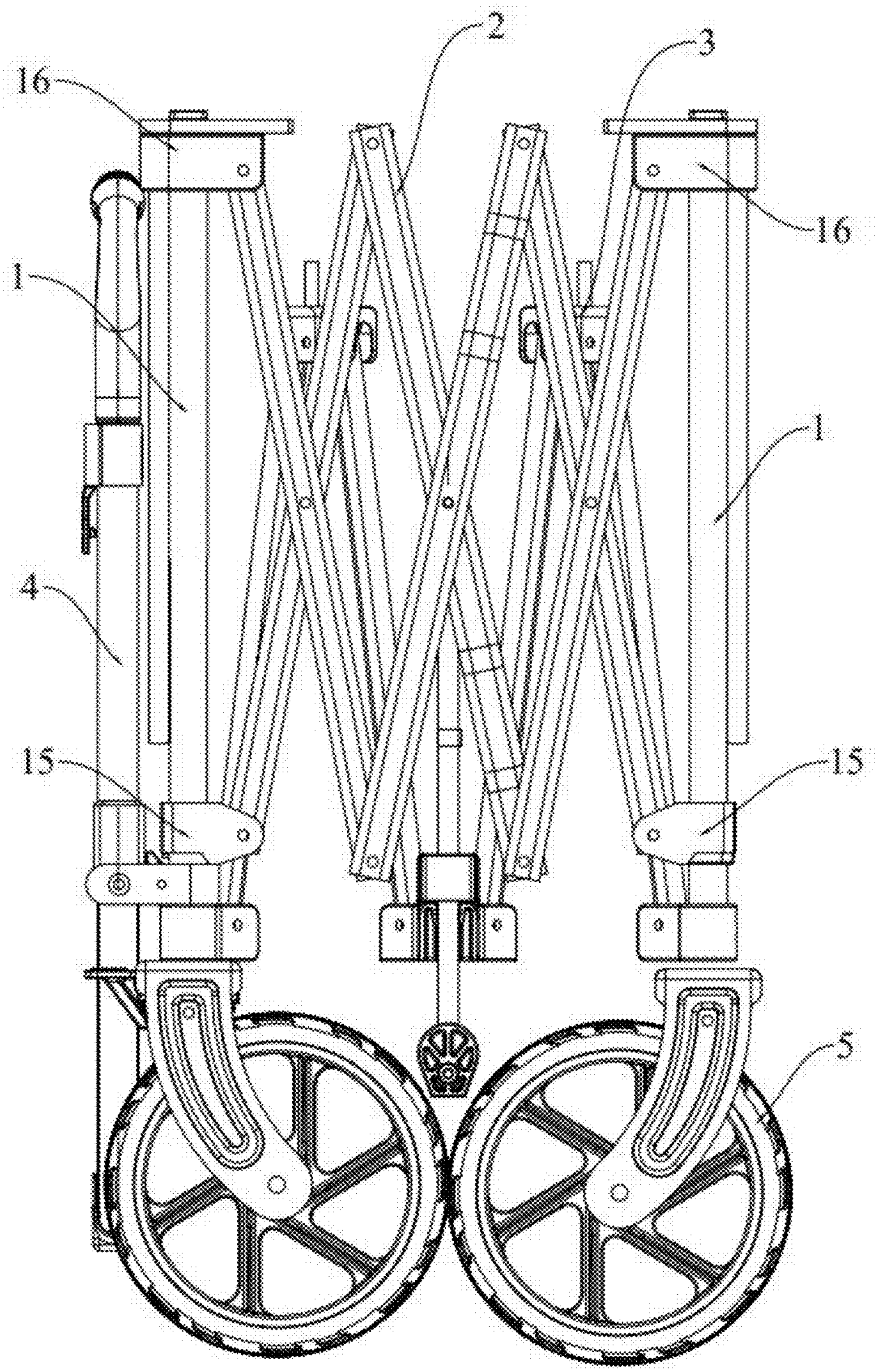
FIG. 13 is a schematic diagram of the wagon with the height reduced after being folded in a folded state according to the present disclosure.

As shown in FIGS. 12 and 13, when the wagon with the height reduced after being folded is folded, the side folding mechanisms 2 drive the telescopic standing posts 1 connected thereto to retract and shorten. That is, the first folding mechanism 21 and the third folding mechanism 23 drive the first telescopic standing post 11 to retract with a top end shortened. The first folding mechanism 21 and the fourth folding mechanism 24 drive the second telescopic standing post 12 to retract with a top end shortened. The second folding mechanism 22 and the third folding mechanism 23 drive the fourth telescopic standing post 14 to retract with a top end shortened. The second folding mechanism 22 and the fourth folding mechanism 24 drive the third telescopic standing post 13 to retract with a top end shortened. During the folding process, the telescopic standing posts 1 automatically retract and shorten, making it easy to operate and convenient for users. On the contrary, when the wagon with the height reduced after being folded is unfolded, the side folding mechanisms 2 drive the telescopic standing posts 1 connected thereto to extend with their top ends heightened. That is, the first folding mechanism 21 and the third folding mechanism 23 drive the first telescopic standing post 11 to extend with a top end heightened. The first folding mechanism 21 and the fourth folding mechanism 24 drive the second telescopic standing post 12 to extend with a top end heightened. The second folding mechanism 22 and the third folding mechanism 23 drive the fourth telescopic standing post 14 to extend with a top end heightened. The second folding mechanism 22 and the fourth folding mechanism 24 drive the third telescopic standing post 13 to extend with a top end heightened. During the unfolding process, the telescopic standing posts 1 automatically extend with their top ends heightened, making it easy to operate and convenient for users. Therefore, the unfolded capacity and folded volume of the wagon are changed by the telescopic standing posts 1. In the unfolding process, the telescopic standing posts 1 extend with their top ends heightened, increasing the height of the wagon unfolded and thereby increasing the internal capacity of the wagon. In the folding process, the telescopic standing posts 1 retract with their top ends shortened, reducing the overall height of the wagon with the height reduced after being folded, and reducing the space occupied by the wagon, making it easy to carry and transport.

Figure 4:
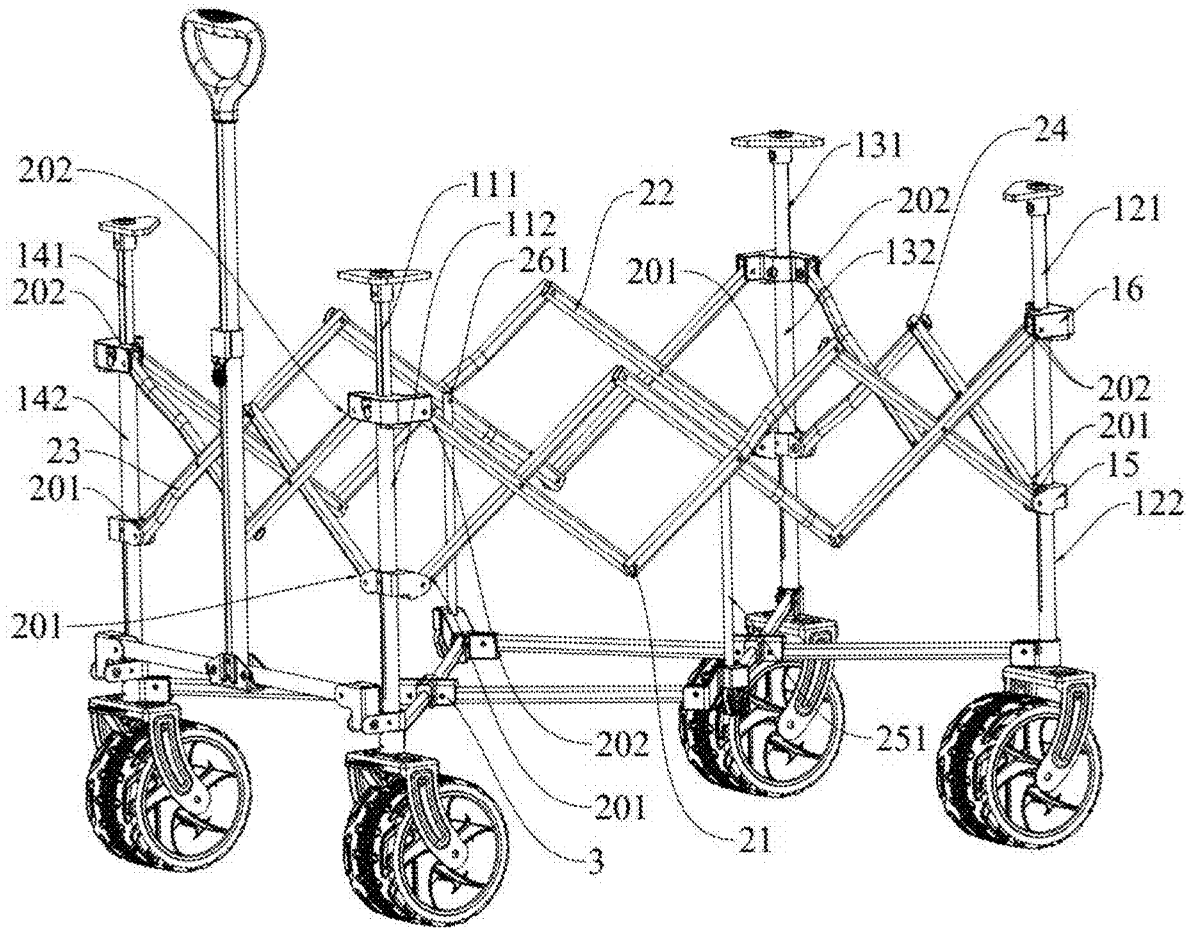
FIG. 4 is a structural diagram of telescopic standing posts in the first embodiment of the wagon with the height reduced after being folded according to the present disclosure.
Figure 5:
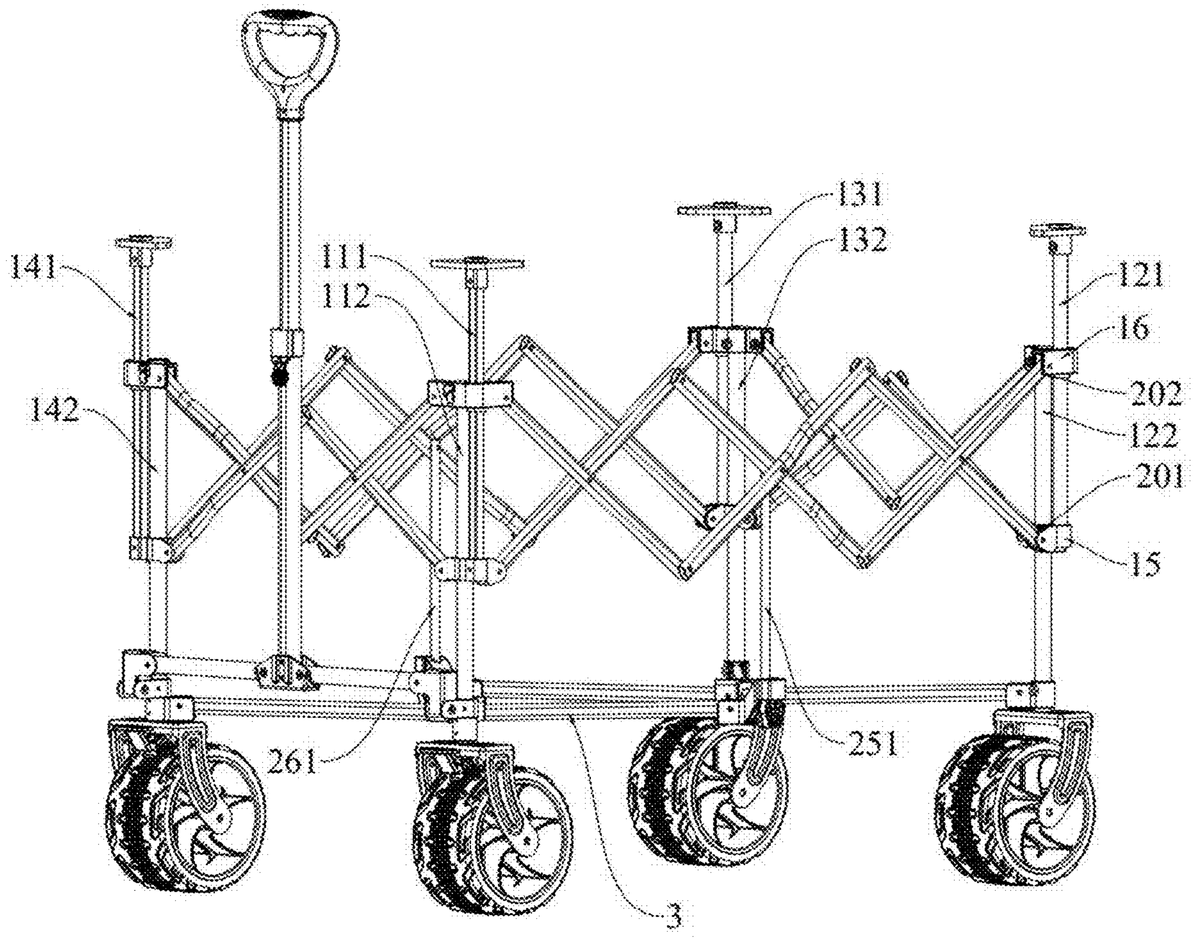
FIG. 5 is a structural diagram of telescopic standing posts in a second embodiment of the wagon with the height reduced after being folded according to the present disclosure.

Furthermore, as shown in FIGS. 3 to 5, the first telescopic standing post 11 includes first lifting rod 111, the second telescopic standing post 12 includes second lifting rod 121, the third telescopic standing post 13 includes third lifting rod 131, and the fourth telescopic standing post 14 includes fourth lifting rod 141. A top of the lifting rod corresponds to a top of the corresponding telescopic standing post 1. Referring to FIG. 4, two ends of the first folding mechanism 21 are provided with linkage ends 201 that are hinged to the first lifting rod 111 and the second lifting rod 121, respectively. Two ends of the second folding mechanism 22 are provided with linkage ends 201 that are hinged to the third lifting rod 131 and the fourth lifting rod 141, respectively. Two ends of the third folding mechanism 23 are provided with linkage ends 201 that are hinged to the first lifting rod 111 and the fourth lifting rod 141, respectively. Two ends of the fourth folding mechanism 24 are provided with linkage ends 201 that are hinged to the second lifting rod 121 and the third lifting rod 131, respectively. When the wagon with the height reduced after being folded is folded, the lateral length of each side folding mechanism 2 is reduced. The linkage ends 201 at the two ends of each side folding mechanism 2 drive the corresponding lifting rods to automatically move downward, causing each telescopic standing post 1 to automatically retract and shorten. When the wagon with the height reduced after being folded is unfolded, the lateral length of each side folding mechanism 2 increases. The linkage ends 201 at the two ends of each side folding mechanism 2 drive the corresponding lifting rods to automatically move upward, causing each telescopic standing post 1 to automatically extend with the top end heightened. Moreover, the height of each side folding mechanism 2 folded after being is smaller than the height of the telescopic standing post 1 that retracts with the top end shortened.

Furthermore, as shown in FIGS. 3 to 5, the first telescopic standing post 11 further includes first fixed vertical rod 112, the second telescopic standing post 12 further includes second fixed vertical rod 122, the third telescopic standing post 13 further includes third fixed vertical rod 132, and the fourth telescopic standing post 14 further includes fourth fixed vertical rod 142. The first lifting rod 111 slides vertically relative to the first fixed vertical rod 112, the second lifting rod 121 slides vertically relative to the second fixed vertical rod 122, the third lifting rod 131 slides vertically relative to the third fixed vertical rod 132, and the fourth lifting rod 141 slides vertically relative to the fourth fixed vertical rod 142. Two ends of the first folding mechanism 21 are provided with fixed ends 202 that are hinged to the first fixed vertical rod 112 and the second fixed vertical rod 122, respectively. Two ends of the second folding mechanism 22 are provided with fixed ends 202 that are hinged to the third fixed vertical rod 132 and the fourth fixed vertical rod 142, respectively. Two ends of the third folding mechanism 23 are provided with fixed ends 202 that are hinged to the first fixed vertical rod 112 and the fourth fixed vertical rod 142, respectively. Two ends of the fourth folding mechanism 24 are provided with fixed ends 202 that are hinged to the second fixed vertical rod 122 and the third fixed vertical rod 132, respectively. When each side folding mechanism 2 is folded or unfolded, each fixed end 202 rotates around a hinge shaft that is hinged to the corresponding fixed vertical rod, and the fixed end 202 does not move up and down. Each linkage end 201 drives the lifting rod hinged thereto to move in a length direction of the fixed vertical rod, that is, in a vertical direction.

Specifically, as shown in FIGS. 3 to 5, linkage sliding sleeves 15 are respectively slidably provided on the first fixed vertical rod 112, the second fixed vertical rod 122, the third fixed vertical rod 132, and the fourth fixed vertical rod 142. The first lifting rod 111, the second lifting rod 121, the third lifting rod 131, and the fourth lifting rod 141 are respectively connected to the linkage sliding sleeves 15 on the first fixed vertical rod 112, the second fixed vertical rod 122, the third fixed vertical rod 132, and the fourth fixed vertical rod 142 in one-to-one correspondence. The linkage ends 201 at the two ends of the first folding mechanism 21 are hinged to the linkage sliding sleeves 15 on the first fixed vertical rod 112 and the second fixed vertical rod 122, respectively. The linkage ends 201 at the two ends of the second folding mechanism 22 are hinged to the linkage sliding sleeves 15 on the third fixed vertical rod 132 and the fourth fixed vertical rod 142, respectively. The linkage ends 201 at the two ends of the third folding mechanism 23 are hinged to the linkage sliding sleeves 15 on the first fixed vertical rod 112 and the fourth fixed vertical rod 142, respectively. The linkage ends 201 at the two ends of the fourth folding mechanism 24 are hinged to the linkage sliding sleeves 15 on the second fixed vertical rod 122 and the third fixed vertical rod 132, respectively. Tops of the first fixed vertical rod 112, the second fixed vertical rod 122, the third fixed vertical rod 132, and the fourth fixed vertical rod 142 are all provided with top fixing elements 16. The fixed ends 202 at the two ends of the first folding mechanism 21 are hinged to the top fixing elements 16 on the first fixed vertical rod 112 and the second fixed vertical rod 122, respectively. The fixed ends 202 at the two ends of the second folding mechanism 22 are hinged to the top fixing elements 16 on the third fixed vertical rod 132 and the fourth fixed vertical rod 142, respectively. The fixed ends 202 at the two ends of the third folding mechanism 23 are hinged to the top fixing elements 16 on the first fixed vertical rod 112 and the fourth fixed vertical rod 142, respectively. The fixed ends 202 at the two ends of the fourth folding mechanism 24 are hinged to the top fixing elements 16 on the second fixed vertical rod 122 and the third fixed vertical rod 132, respectively. When the wagon with the height reduced after being folded is folded, the linkage end 201 hinged to the linkage sliding sleeve 15 drives the lifting rod to move downward through the linkage sliding sleeve 15. When the wagon with the height reduced after being folded is unfolded, the linkage end 201 hinged to the linkage sliding sleeve 15 drives the lifting rod to move upward through the linkage sliding sleeve 15.

The structures of the first telescopic standing post 11, the second telescopic standing post 12, the third telescopic standing post 13, and the fourth telescopic standing post 14 include the following two embodiments.

Referring to FIG. 5, a first embodiment is illustrated with the first telescopic standing post 11 as an example. The first lifting rod 111 is located outside the first fixed vertical rod 112. The top fixing element 16 on the first fixed vertical rod 112 is provided with a through-hole, with a central axis parallel to a central axis of the first fixed vertical rod 112. The first lifting rod 111 is fitted into the through-hole to allow a sliding connection between the first lifting rod 111 and the top fixing element 16 on the first fixed vertical rod 112. When the first lifting rod 111 moves up and down, the top fixing element 16 on the first fixed vertical rod 112 limits the first lifting rod 111 laterally, such that the first lifting rod 111 can only move in the direction of the central axis of the through-hole. The structures of the second telescopic standing post 12, the third telescopic standing post 13, and the fourth telescopic standing post 14 are the same as that of the first telescopic standing post 11, and will not be repeated herein.

Referring to FIG. 4, a second embodiment is illustrated with the first telescopic standing post 11 as an example. The first fixed vertical rod 112 is a hollow structure, and the first lifting rod 111 is slidably nested inside the first fixed vertical rod 112. The linkage sliding sleeve 15 on the first fixed vertical rod 112 is slidably sleeved outside the first fixed vertical rod 112. The first fixed vertical rod 112 is provided with vertical slot hole 17. The first lifting rod 111 is connected to the linkage sliding sleeve 15 on the first fixed vertical rod 112 through a connecting element. The connecting element includes a rivet, a bolt, etc. The connecting element is not limited herein as long as it can detachably connect the first lifting rod 111 to the linkage sliding sleeve 15 on the first fixed vertical rod 112 through the slot hole 17. When the first lifting rod 111 moves up and down, the first fixed vertical rod 112 limits the first lifting rod 111 laterally, such that the first lifting rod 111 can only move in the direction of the central axis of the first fixed vertical rod 112. The structures of the second telescopic standing post 12, the third telescopic standing post 13, and the fourth telescopic standing post 14 are the same as that of the first telescopic standing post 11, and will not be repeated herein.

The side folding mechanisms 2 located at the left and right sides can be formed in a first structure or a second structure, while the side folding mechanisms 2 located on the front and rear sides are formed in the first structure, specifically as follows.

First Structure:

As shown in FIGS. 4 to 9, in the first structure, the side folding mechanism 2 includes a plurality of X-shaped rod sets that are sequentially hinged. The X-shaped rod set includes first connecting rod 2111 and second connecting rod 2112 that are hinged in a central part, with a hinge point not limited to a center point of the first connecting rod 2111 and the second connecting rod 2112. According to an actual requirement, the hinge point may deviate from the center point. In the first folding mechanism 21, the second folding mechanism 22, the third folding mechanism 23, and the fourth folding mechanism 24, a first end of the first connecting rod 2111 in the X-shaped rod set located at a head end forms the fixed end 202, and a first end of the second connecting rod 2112 in the X-shaped rod set located at the head end forms the linkage end 201. A first end of the first connecting rod 2111 in the X-shaped rod set located at a tail end forms the fixed end 202, and a first end of the second connecting rod 2112 in the X-shaped rod set located at the tail end forms the linkage end 201. In the X-shaped rod set, the first end of the first connecting rod 2111 and the first end of the second connecting rod 2112 are located at a same side. The adjacent fixed ends 202 of each two adjacent side folding mechanisms 2 are connected to the same top fixing element 16, and the adjacent linkage ends 201 of each two adjacent side folding mechanisms 2 are connected to the same linkage sliding sleeve 15.

Figure 6:
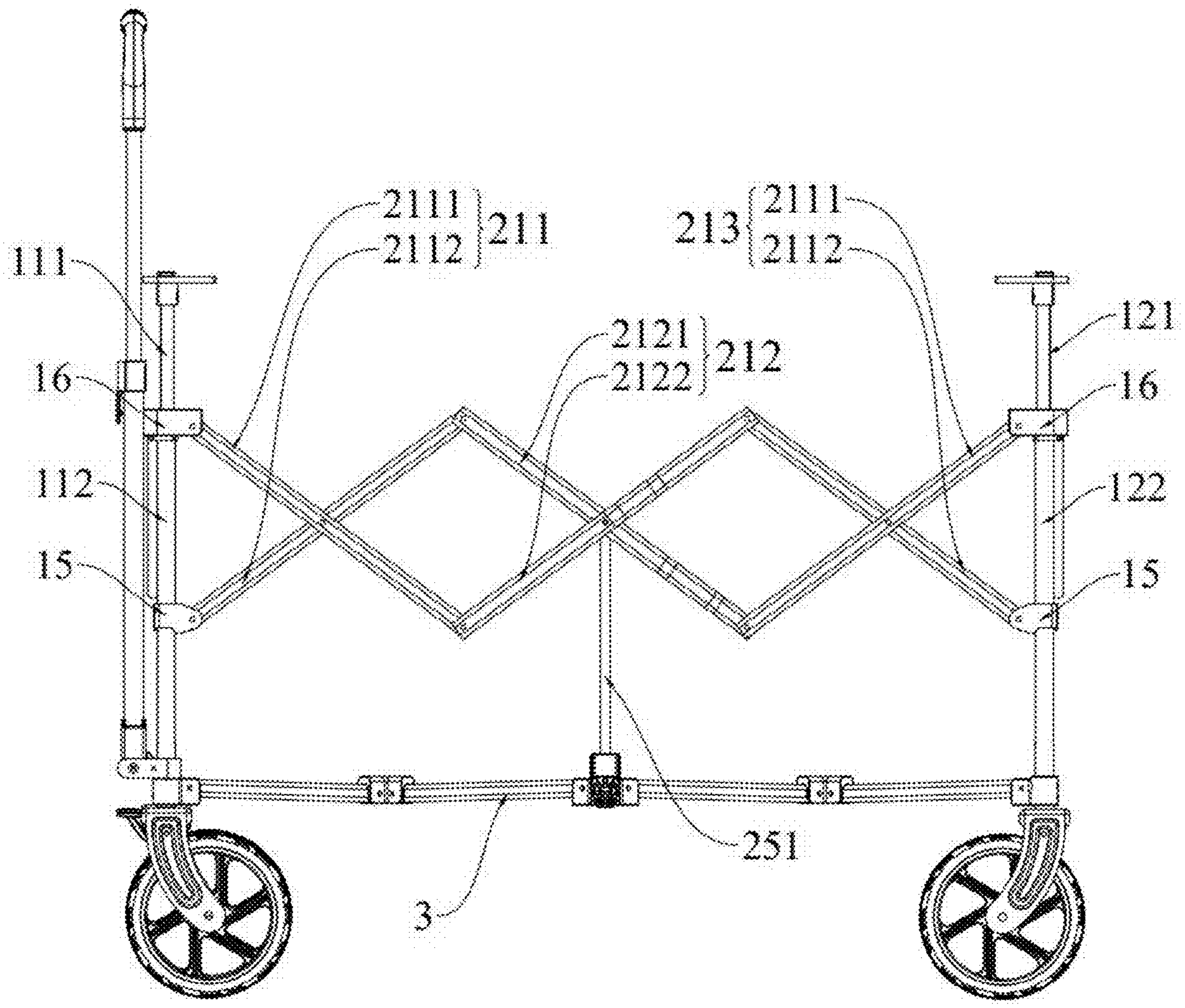
FIG. 6 is a side view of the first embodiment of the wagon with the height reduced after being folded according to the present disclosure.
Figure 7:
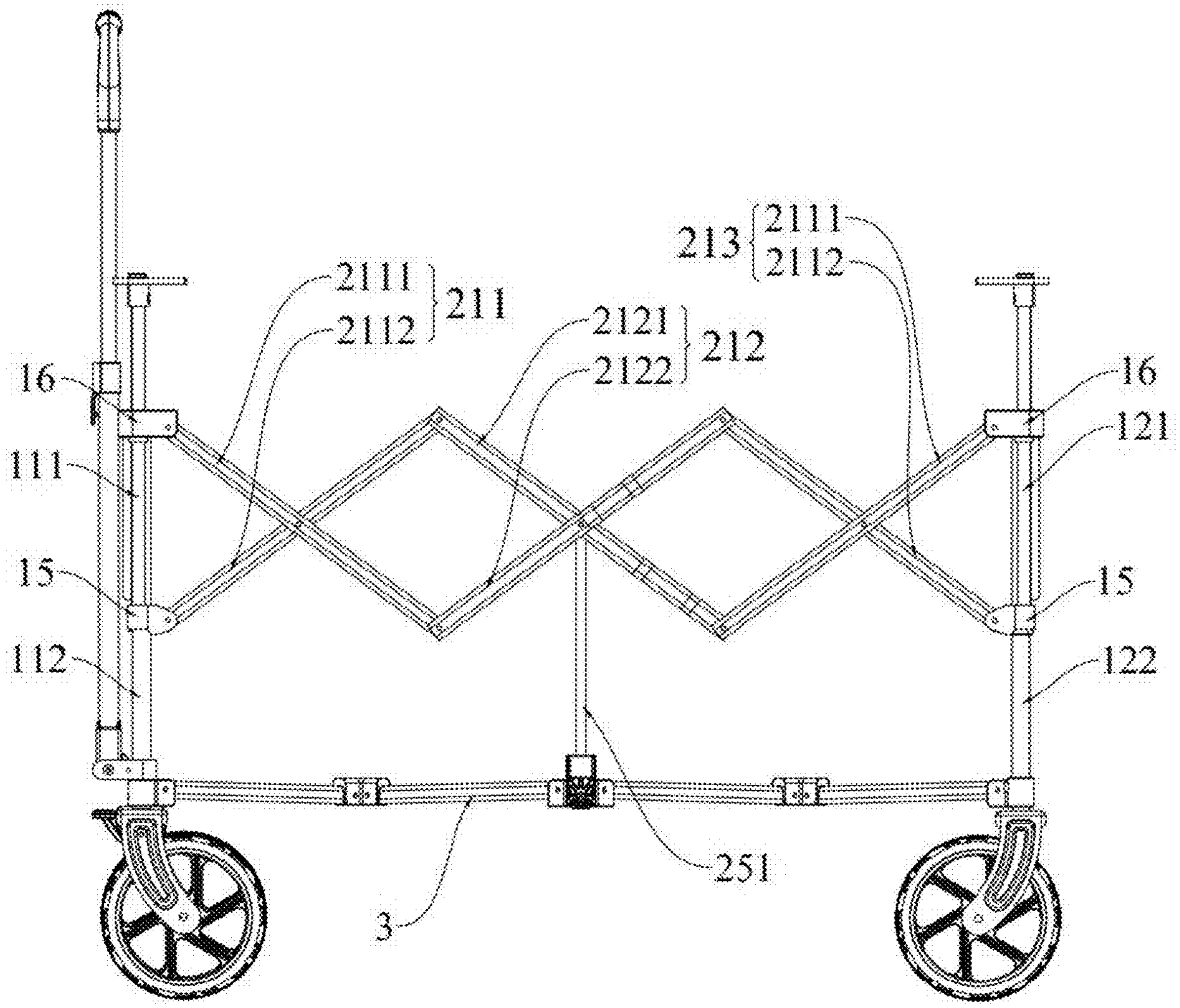
FIG. 7 is a side view of the second embodiment of the wagon with the height reduced after being folded according to the present disclosure.

In a preferred implementation, the first folding mechanism 21 and the second folding mechanism 22 each include three sequentially hinged X-shaped rod sets, namely first X-shaped rod set 211, second X-shaped rod set 212, and third X-shaped rod set 213. The first X-shaped rod set 211 is located at the head end, the third X-shaped rod set 213 is located at the tail end, and the second X-shaped rod set 212 is located between the first X-shaped rod set 211 and the third X-shaped rod set 213. The second X-shaped rod set 212 includes third connecting rod 2121 and fourth connecting rod 2122 with their rod bodies hinged to each other. The first ends of the first connecting rods 2111 in the first X-shaped rod set 211 and the third X-shaped rod set 213 form the fixed ends 202, and the first ends of the second connecting rods 2112 in the first X-shaped rod set 211 and the third X-shaped rod set 213 form the linkage ends 201. The first folding mechanism 21 and the second folding mechanism 22 have the same structure and symmetrical positions, so the specific illustration is made with the first folding mechanism 21 as an example. Referring to FIGS. 6 and 7, in the first folding mechanism 21, the first end of the first connecting rod 2111 in the first X-shaped rod set 211 is hinged to the top fixing element 16 on the first fixed vertical rod 112, and the first end of the second connecting rod 2112 in the first X-shaped rod set 211 is hinged to the linkage sliding sleeve 15 on the first fixed vertical rod 112. The first end of the first connecting rod 2111 in the third X-shaped rod set 213 is hinged to the top fixing element 16 on the second fixed vertical rod 122, and the first end of the second connecting rod 2112 in the third X-shaped rod set 213 is hinged to the linkage sliding sleeve 15 on the second fixed vertical rod 122. A second end of the first connecting rod 2111 in the first X-shaped rod set 211 is hinged to the first end of the fourth connecting rod 2122. A second end of the second connecting rod 2112 in the first X-shaped rod set 211 is hinged to the first end of the third connecting rod 2121. The second end of the first connecting rod 2111 in the third X-shaped rod set 213 is hinged to a second end of the third connecting rod 2121. The second end of the second connecting rod 2112 in the third X-shaped rod set 213 is hinged to a second end of the fourth connecting rod 2122. In the second folding mechanism, the first end of the first connecting rod in the first X-shaped rod set is hinged to the top fixing element on the fourth fixed vertical rod, and the first end of the second connecting rod in the first X-shaped rod set is hinged to the linkage sliding sleeve on the fourth fixed vertical rod. The first end of the first connecting rod in the third X-shaped rod set is hinged to the top fixing element on the third fixed vertical rod, and the first end of the second connecting rod in the third X-shaped rod set is hinged to the linkage sliding sleeve on the third fixed vertical rod. The second end of the first connecting rod in the first X-shaped rod set is hinged to the first end of the fourth connecting rod, and the second end of the second connecting rod in the first X-shaped rod set is hinged to the first end of the third connecting rod. The second end of the first connecting rod in the third X-shaped rod set is hinged to the second end of the third connecting rod, and the second end of the second connecting rod in the third X-shaped rod set is hinged to the second end of the fourth connecting rod.

Figure 8:
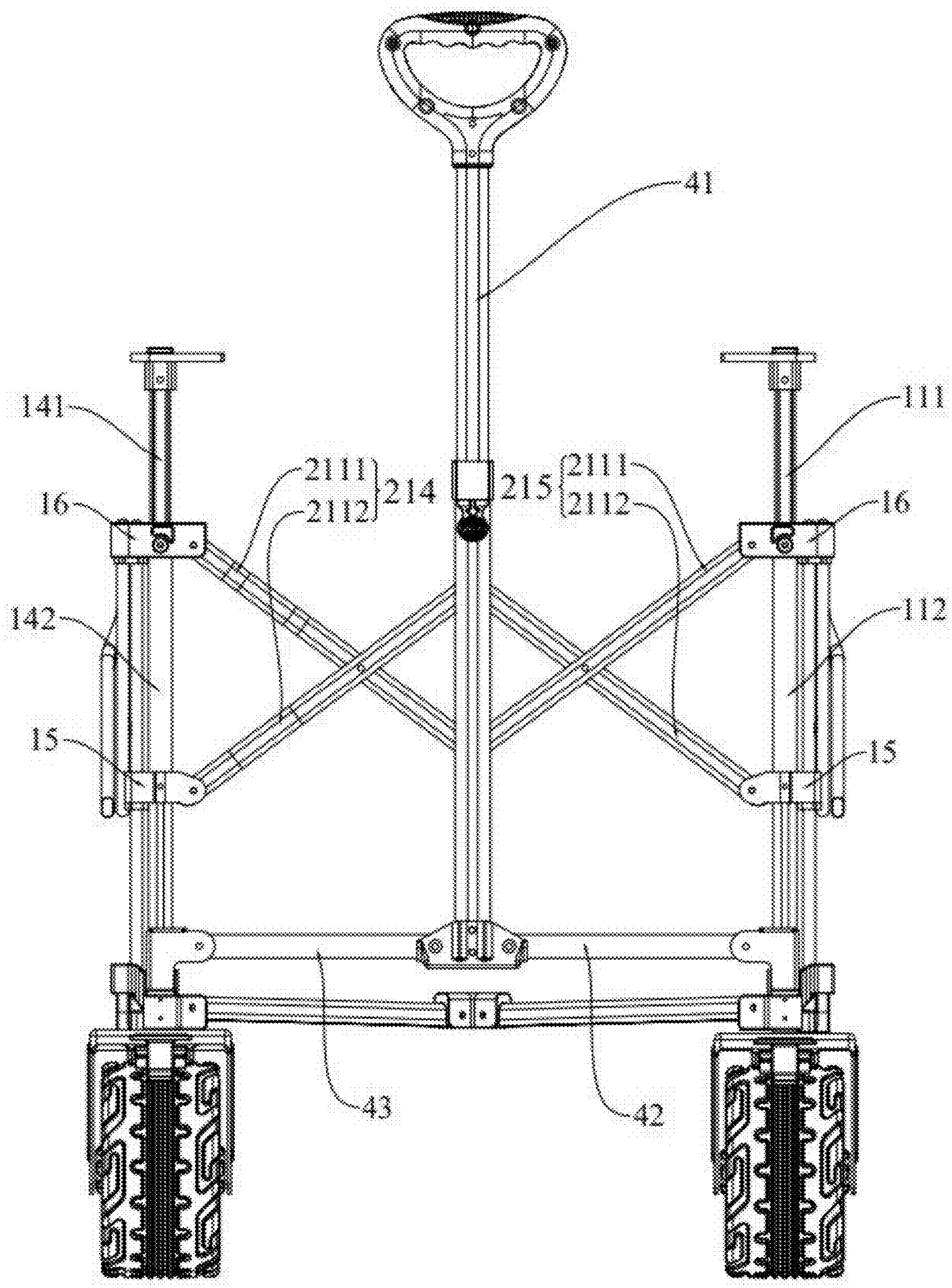
FIG. 8 is a front view of the first embodiment of the wagon with the height reduced after being folded according to the present disclosure.
Figure 9:
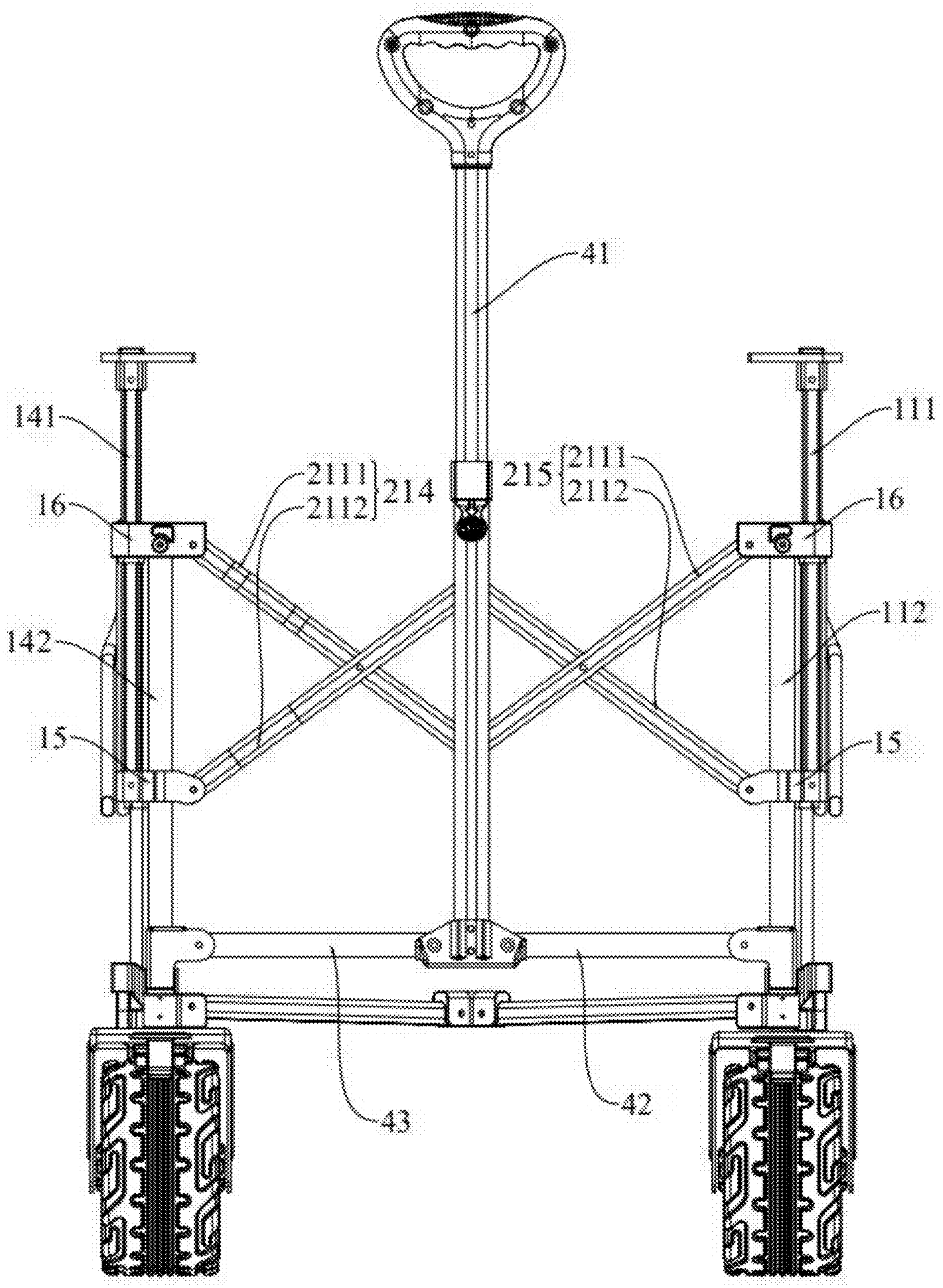
FIG. 9 is a front view of the second embodiment of the wagon with the height reduced after being folded according to the present disclosure.

In a preferred implementation, the third folding mechanism 23 and the fourth folding mechanism 24 each include two X-shaped rod sets, namely fourth X-shaped rod set 214 and fifth X-shaped rod set 215. The fourth X-shaped rod set 214 is an X-shaped rod set located at the head end, and the fifth X-shaped rod set 215 is an X-shaped rod set located at the tail end. The first ends of the first connecting rods 2111 in the fourth X-shaped rod set 214 and the fifth X-shaped rod set 215 form the fixed ends 202, and the first ends of the second connecting rods 2112 in the fourth X-shaped rod set 214 and the fifth X-shaped rod set 215 form the linkage ends 201. The third folding mechanism 23 and the fourth folding mechanism 24 have the same structure and symmetrical positions, so the specific illustration is made with the third folding mechanism 23 as an example. Referring to FIGS. 8 and 9, in the third folding mechanism 23, the first end of the first connecting rod 2111 of the fourth X-shaped rod set 214 is hinged to the top fixing element 16 on the fourth fixed vertical rod 142, and the first end of the second connecting rod 2112 in the fourth X-shaped rod set 214 is hinged to the linkage sliding sleeve 15 on the fourth fixed vertical rod 142. The first end of the first connecting rod 2111 in the fifth X-shaped rod set 215 is hinged to the top fixing element 16 on the first fixed vertical rod 112, and the first end of the second connecting rod 2112 in the fifth X-shaped rod set 215 is hinged to the linkage sliding sleeve 15 on the first fixed vertical rod 112. The second end of the first connecting rod 2111 in the fourth X-shaped rod set 214 is hinged to the second end of the first connecting rod 2111 in the fifth X-shaped rod set 215, and the second end of the second connecting rod 2112 in the fourth X-shaped rod set 214 is hinged to the second end of the second connecting rod 2112 in the fifth X-shaped rod set 215. In the fourth folding mechanism, the first end of the first connecting rod in the fourth X-shaped rod set is hinged to the top fixing element on the third fixed vertical rod, and the first end of the second connecting rod in the fourth X-shaped rod set is hinged to the linkage sliding sleeve on the third fixed vertical rod. The first end of the first connecting rod in the fifth X-shaped rod set is hinged to the top fixing element on the second fixed vertical rod, and the first end of the second connecting rod in the fifth X-shaped rod set is hinged to the linkage sliding sleeve on the second fixed vertical rod. The second end of the first connecting rod in the fourth X-shaped rod set is hinged to the second end of the first connecting rod in the fifth X-shaped rod set, and the second end of the second connecting rod in the fourth X-shaped rod set is hinged to the second end of the second connecting rod in the fifth X-shaped rod set.

Figure 10:
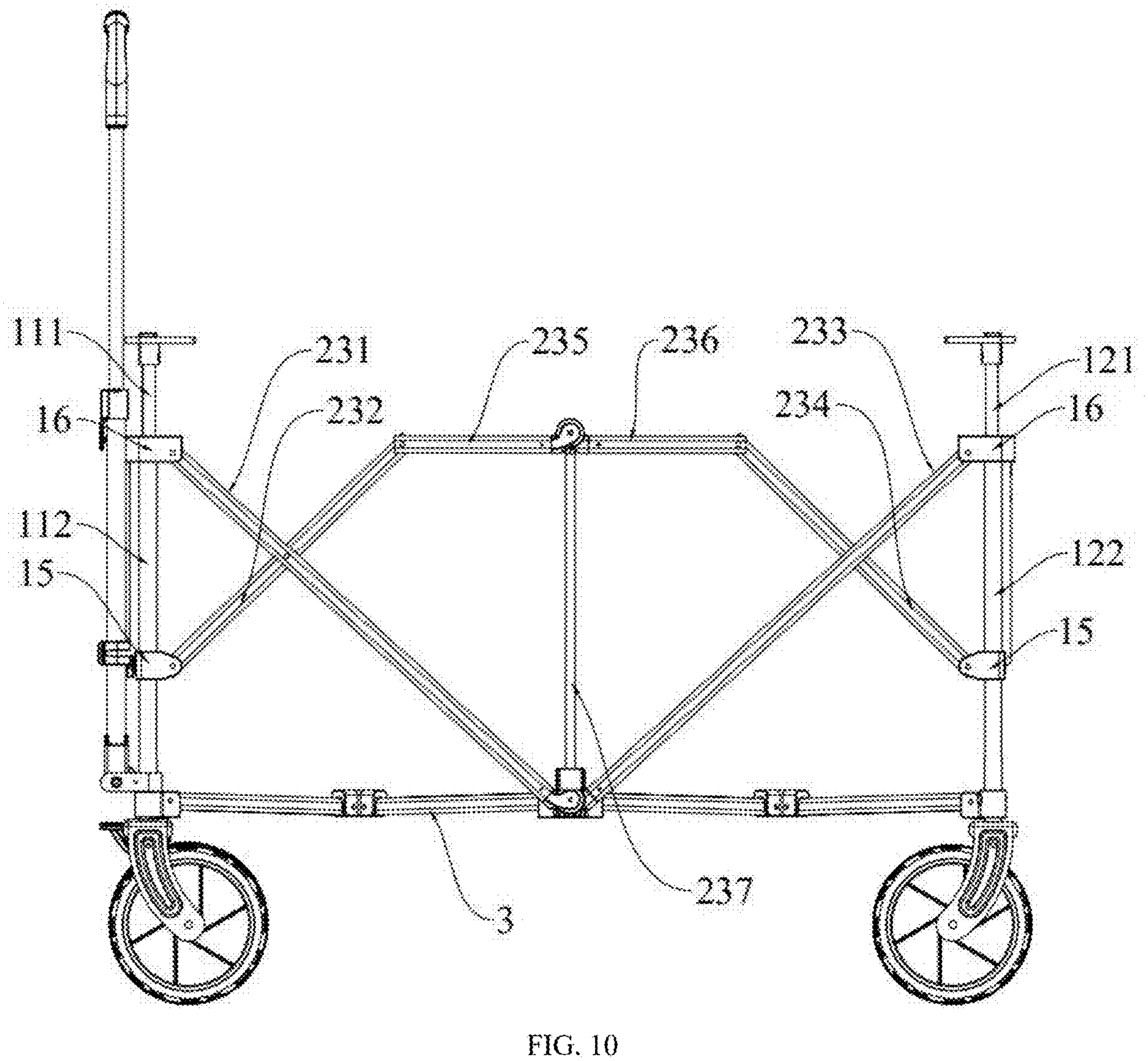
FIG. 10 is a side view of the first structure of the wagon with the height reduced after being folded according to the present disclosure.

Second Structure:

As shown in FIG. 10, in the second structure, the side folding mechanisms 2 include the first folding mechanism 21 and the second folding mechanism 22. The side folding mechanism includes first crossing rod 231 and second crossing rod 232 located at one end, third crossing rod 233 and fourth crossing rod 234 located at the other end, and a T-shaped folding assembly located in a central position. The first crossing rod 231 and the second crossing rod 232 are hinged in a central part, and the third crossing rod 233 and the fourth crossing rod 234 are hinged in a central part. The hinge point is not limited to a center point of the two crossing rods, and it can deviate from the center point according to an actual requirement. A first end of the first crossing rod 231 forms the fixed end 202, and a first end of the second crossing rod 232 forms the linkage end 201. The first end of the first crossing rod 231 and the first end of the second crossing rod 232 are located at the same side. A first end of the third crossing rod 233 forms the fixed end 202, and a first end of the fourth crossing rod 234 forms the linkage end 201. The first end of the third crossing rod 233 and the first end of the fourth crossing rod 234 are located at the same side. The T-shaped folding assembly includes fifth crossing rod 235, sixth crossing rod 236, and seventh crossing rod 237. A first end of the fifth crossing rod 235 is hinged to a second end of the second crossing rod 232, a first end of the sixth crossing rod 236 is hinged to a second end of the fourth crossing rod 234, and a second end of the fifth crossing rod 235 is hinged to a second end of the sixth crossing rod 236. A hinge portion between the fifth crossing rod 235 and the sixth crossing rod 236 is connected to a first end of the seventh crossing rod 237. Second ends of the first crossing rod 231 and the third crossing rod 233 are hinged to a second end of the seventh crossing rod 237. Similarly, the first folding mechanism 21 and the second folding mechanism 22 have the same structure and symmetrical positions, so the specific illustration is made with the first folding mechanism 21 as an example. Referring to FIG. 10, in the first folding mechanism 21, the first end of the first crossing rod 231 is hinged to the top fixing element 16 on the first fixed vertical rod 112, the first end of the second crossing rod 232 is hinged to the linkage sliding sleeve 15 on the first fixed vertical rod 112, the first end of the third crossing rod 233 is hinged to the top fixing element 16 on the second fixed vertical rod 122, and the first end of the fourth crossing rod 234 is hinged to the linkage sliding sleeve 15 on the second fixed vertical rod 122. In the second folding mechanism 22, the first end of the first crossing rod 231 is hinged to the top fixing element 16 on the fourth fixed vertical rod 142, the first end of the second crossing rod 232 is hinged to the linkage sliding sleeve 15 on the fourth fixed vertical rod 142, the first end of the third crossing rod 233 is hinged to the top fixing element 16 on the third fixed vertical rod 132, and the first end of the fourth crossing rod 234 is hinged to the linkage sliding sleeve 15 on the third fixed vertical rod 132. In the first structure and the second structure, when the wagon with the height reduced after being folded is folded, the fixed end 202 and the linkage end 201 located at the same side move away from each other, and the linkage end 201 drives the lifting rod to descend. When the wagon with the height reduced after being folded is unfolded, the fixed end 202 and the linkage end 201 located at the same side approach each other, and the linkage end 201 drives the lifting rod to rise.

Figure 11:
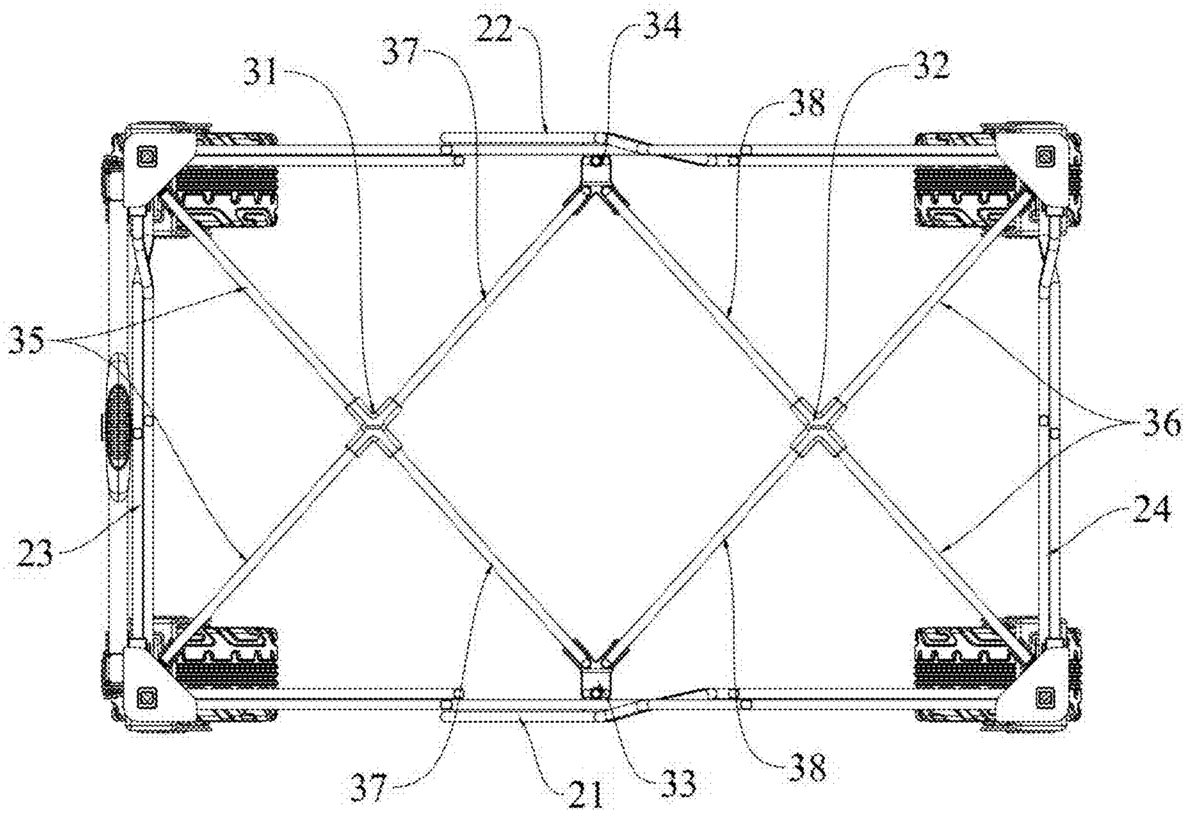
FIG. 11 is a top view of the wagon with the height reduced after being folded according to the present disclosure.

As shown in FIG. 11, the wagon with the height reduced after being folded further includes bottom support mechanism 3. The bottom support mechanism 3 is hinged between the four telescopic standing posts 1. The first folding mechanism 21 and the second folding mechanism 22 are connected to the bottom support mechanism 3 through first connecting assembly 25 and second connecting assembly 26, respectively. The bottom support mechanism 3 is foldable, and a height of the bottom support mechanism after being folded is smaller than the height of the telescopic standing post 1. Furthermore, the bottom support mechanism 3 includes first bottom connector 31 and second bottom connector 32. The first connecting assembly 25 is provided with third bottom connector 33, and the second connecting assembly 26 is provided with fourth bottom connector 34. The first bottom connector 31 is rotatably connected at a limited angle to lower ends of the first telescopic standing post 11 and the fourth telescopic standing post 14 through first bottom connecting rods 35. The second bottom connector 32 is rotatably connected at a limited angle to lower ends of the second telescopic standing post 12 and the third telescopic standing post 13 through second bottom connecting rods 36. The first bottom connector 31 is rotatably connected at a limited angle to the third bottom connector 33 and the fourth bottom connector 34 through third bottom connecting rods 37. The second bottom connector 32 is rotatably connected at a limited angle to the third bottom connector 33 and the fourth bottom connector 34 through fourth bottom connecting rods 38. When the wagon with the height reduced after being folded is in the folded state, heights of the first bottom connector 31 and the second bottom connector 32 are smaller than the height of the telescopic standing post 1.

Specifically, the first connecting assembly 25 and the second connecting assembly 26 can be suspension rods or flexible components. When there are an odd number of X-shaped rod sets in the first folding mechanism 21 and the second folding mechanism 22, the first connecting assembly 25 and the second connecting assembly 26 are suspension rods. When there are an even number of X-shaped rod sets in the first folding mechanism 21 and the second folding mechanism 22, the first connecting assembly 25 and the second connecting assembly 26 are flexible components, such as steel wire ropes. One end of the first connecting assembly 25 and one end of the second connecting assembly 26 are respectively connected to the first folding mechanism 21 and the second folding mechanism 22, and the other end of the first connecting assembly and the other end of the second connecting assembly are respectively connected to the third bottom connector 33 and the fourth bottom connector 34. For example, in the first structure, the first folding mechanism 21 and the second folding mechanism 22 each include three X-shaped rod sets. In this case, referring to FIGS. 4 to 7, the first connecting assembly 25 is formed by first suspension rod 251, the second connecting assembly 26 is formed by second suspension rod 261, and the third bottom connector 33 and the fourth bottom connector 34 are formed by suspension rod joints. The suspension rod joints are slidably connected to the first suspension rod 251 and the second suspension rod 261. The suspension rod joint is provided with mounting slots that are hinged to the third bottom connecting rod 37 and the fourth bottom connecting rod 38. The mounting slot is open upward, restricting the third bottom connecting rod 37 and the fourth bottom connecting rod 38 to rotate only from a folded tilted state to a horizontal state. Ends of the first suspension rod 251 and the second suspension rod 261 each are provided with a limit joint for restricting the suspension rod joint. When the suspension rod joint moves along the first suspension rod 251 or the second suspension rod 261 to the limit joint, the suspension rod joint is restricted from moving and cannot be separated from the corresponding suspension rod. Referring to FIG. 11, the first bottom connector 31 and the second bottom connector 32 each are symmetrically provided with four mounting slots. The two first bottom connecting rods 35 and the two third bottom connecting rods 37 are respectively rotatably connected to inner walls of the four mounting slots on the first bottom connector 31 in one-to-one correspondence. The two second bottom connecting rods 36 and the two fourth bottom connecting rods 38 are respectively rotatably connected to inner walls of the four mounting slots on the second bottom connector 32 in one-to-one correspondence. When the wagon is in the unfolded state, a bottom of the mounting slot is horizontal and open downward. The two first bottom connecting rods 35 and the two third bottom connecting rods 37 are respectively located in the corresponding mounting slots on the first bottom connector 31, and the two second bottom connecting rods 36 and the two fourth bottom connecting rods 38 are respectively located in the corresponding mounting slots on the second bottom connector 32. When each bottom connecting rod is rotated from the folded tilted state relative to the first bottom connector 31 and the second bottom connector 32 until a tube wall abuts against the bottom of the mounting slot, each connecting rod is restricted by the mounting slot and cannot continue to rotate, thereby maintaining the horizontal state and providing effective support for the bottom of the wagon. The lower ends of the first telescopic standing post 11, the second telescopic standing post 12, the third telescopic standing post 13, and the fourth telescopic standing post 14 are horizontally provided with mounting slots that are open upward. The two first bottom connecting rods 35 are hinged to the mounting slots at the lower ends of the first telescopic standing post 11 and the fourth telescopic standing post 14, respectively. The two second bottom connecting rods 36 are hinged to the mounting slots at the lower ends of the second telescopic standing post 12 and the third telescopic standing post 13, respectively. The mounting slot restricts the first bottom connecting rod 35 and the second bottom connecting rod 36 to rotate only from the folded tilted state to the horizontal state. When the first folding mechanism 21 and the second folding mechanism 22 are constructed in the second structure, in the first folding mechanism 21, the second ends of the first crossing rod 231 and the third crossing rod 233 are hinged to the second end of the seventh crossing rod 237, and the second end of the seventh crossing rod 237 is slidably connected to the third bottom connector 33. In the second folding mechanism 22, the second ends of the first crossing rod 231 and the third crossing rod 233 are hinged to the second end of the seventh crossing rod 237, and the second end of the seventh crossing rod 237 is slidably connected to the fourth bottom connector 34.

As shown in FIGS. 1, 2, 8, and 9, the wagon with the height reduced after being folded further includes handle mechanism 4. The handle mechanism 4 includes telescopic rod 41, first crossbar 42, and second crossbar 43. First ends of the first crossbar 42 and the second crossbar 43 are hinged to the telescopic rod 41, and second ends of the first crossbar 42 and the second crossbar 43 are respectively rotatably connected at a limited angle to the lower ends of the first telescopic standing post 11 and the second telescopic standing post 12 in one-to-one correspondence. The telescopic rod 41 is configured to extend and retract. When the telescopic rod 41 is in a retraction state, its height is smaller than the height of the telescopic standing post 1. The lower ends of the four telescopic standing posts 1 are provided with casters 5. Among them, at least one pair of casters 5 are universal wheels, which facilitates users to control of the wagon's direction of travel.

Preferably, the top ends of the four telescopic standing posts 1 are respectively connected to four corners of a fabric bed of the wagon with the height reduced after being folded in one-to-one correspondence. When the wagon is folded or unfolded, the folding mechanisms drive the lifting rods to rise or descend. Therefore, after the wagon with the height reduced after being folded is unfolded, the space for the fabric bed provided on the tops of the telescopic standing posts 1 increases.

It should be understood that in the description of the present disclosure, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified, the terms such as "mounting", "interconnection", "connection" and "fixation" are intended to be understood in a broad sense. For example, the "connection" may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise explicitly specified, when it is described that a first feature is "above" or "below" a second feature, it indicates that the first and second features are in direct contact or the first and second features are in indirect contact through an intermediate feature. In addition, when it is described that the first feature is "over", "above" and "on" the second feature, it indicates that the first feature is directly or obliquely above the second feature, or simply indicates that the horizontal height of the first feature is greater than that of the second feature. When it is described that a first feature is "under", "below" or "beneath" a second feature, it indicates that the first feature is directly or obliquely under the second feature or simply indicates that the horizontal height of the first feature is smaller than that of the second feature.

In the description of this specification, the description with reference to the terms such as "one embodiment", "some embodiments", "example", "specific example" or "some examples" means that specific features, structures, materials or characteristics described in connection with the embodiment or example are included in at least one embodiment or example of the present disclosure. In this specification, the schematic expression of the above terms is not necessarily directed to the same embodiment or example. Furthermore, the specific features, structures, materials, or characteristics described may be combined in a suitable manner in any one or more of embodiments or examples. In addition, those skilled in the art may combine different embodiments or examples described in this specification and characteristics of the different embodiments or examples without mutual contradiction.

Although the embodiments of the present disclosure are illustrated above, it should be understood that the above embodiments are merely illustrative and may not be construed as limiting the scope of the present disclosure. Changes, modifications, substitutions and variations may be made to the above embodiments by a person of ordinary skill in the art within the scope of the present disclosure.

The invention claimed is:

1. A wagon with a height reduced after being folded, comprising four telescopic standing posts arranged in a rectangle pattern and at intervals, and at least two side folding mechanisms arranged opposite to each other, wherein two ends of each side folding mechanism of the at least two side folding mechanisms are respectively hinged to two adjacent telescopic standing posts of the four telescopic standing posts; and when the wagon is folded, the at least two side folding mechanisms drive the four telescopic standing posts to retract and shorten; when the wagon is unfolded, the at least two side folding mechanisms drive the four telescopic standing posts to extend; and a height of the wagon in a folded state is smaller than a height of the wagon in an unfolded state.

2. The wagon according to claim 1, wherein each telescopic standing post of the four telescopic standing posts comprises a lifting rod;

a top of the lifting rod forms a top of each telescopic standing post; the two ends of each side folding mechanism are provided with linkage ends, wherein the linkage ends are hinged to the lifting rods of the corresponding telescopic standing posts;

when the wagon is folded, a length of each side folding mechanism is reduced, and the linkage ends drive the lifting rods to move downward;

when the wagon is unfolded, the length of each side folding mechanism is increased, and the linkage ends drive the lifting rods to move upward; and a height of each side folding mechanism after being folded is smaller than a height of each telescopic standing post.

3. The wagon according to claim 2, wherein each telescopic standing post further comprises a fixed vertical rod;

the lifting rod is slidable vertically relative to the fixed vertical rod;

the two ends of each side folding mechanism are further provided with fixed ends; and the fixed ends are hinged to the fixed vertical rods of the corresponding telescopic standing posts; and when each side folding mechanism is folded or unfolded, the fixed end rotates, and the linkage end drives the lifting rod to move along the fixed vertical rod.

4. The wagon according to claim 3, wherein a linkage sliding sleeve is slidably provided on the fixed vertical rod;

the lifting rod is connected to the linkage sliding sleeve, and the linkage end is hinged to the linkage sliding sleeve;

a top of the fixed vertical rod is provided with a top fixing element, and the fixed end is hinged to the top fixing element;

when the wagon is folded, the linkage end hinged to the linkage sliding sleeve drives the lifting rod to move downward through the linkage sliding sleeve; and when the wagon is unfolded, the linkage end hinged to the linkage sliding sleeve drives the lifting rod to move upward through the linkage sliding sleeve.

5. The wagon according to claim 4, wherein the lifting rod is located outside the fixed vertical rod and slidably connected to the top fixing element; and when the lifting rod moves up and down, the top fixing element limits the lifting rod laterally; and alternatively, the fixed vertical rod is a hollow structure, and the lifting rod is slidably nested inside the fixed vertical rod; the linkage sliding sleeve is slidably sleeved outside the fixed vertical rod; the fixed vertical rod is provided with a vertical slot hole; the lifting rod is connected to the linkage sliding sleeve through a connecting element; and when the lifting rod moves up and down, the fixed vertical rod limits the lifting rod laterally.

6. The wagon according to claim 3, wherein the at least two side folding mechanisms comprise four side folding mechanisms located at front, rear, left and right sides; the side folding mechanisms located at the left and right sides are constructed in a first or second structure; and the side folding mechanisms located at the front and rear sides are constructed in the first structure;

in the first structure:

the first structure comprises a plurality of X-shaped rod sets, wherein the plurality of X-shaped rod sets are sequentially hinged; and each of the plurality of X-shaped rod sets comprises a first connecting rod and a second connecting rod, wherein the first connecting rod and the second connecting rod are hinged in a central part;

in each side folding mechanism, as for an X-shaped rod set located at a head end, a first end of the first connecting rod forms the fixed end, and a first end of the second connecting rod forms the linkage end;

as for an X-shaped rod set located at a tail end, a first end of the first connecting rod forms the fixed end, and a first end of the second connecting rod forms the linkage end; and in the X-shaped rod set, the first end of the first connecting rod and the first end of the second connecting rod are located at a first same side;

in the second structure:

the second structure comprises a first crossing rod and a second crossing rod located at a first end, a third crossing rod and a fourth crossing rod located at a second end, and a T-shaped folding assembly located in a central position;

the first crossing rod and the second crossing rod are hinged in a first central part, and the third crossing rod and the fourth crossing rod are hinged in a second central part;

a first end of the first crossing rod forms the fixed end, and a first end of the second crossing rod forms the linkage end; and the first end of the first crossing rod and the first end of the second crossing rod are located at a second same side;

a first end of the third crossing rod forms the fixed end, and a first end of the fourth crossing rod forms the linkage end; and the first end of the third crossing rod and the first end of the fourth crossing rod are located at a third same side;

the T-shaped folding assembly comprises a fifth crossing rod, a sixth crossing rod, and a seventh crossing rod;

a first end of the fifth crossing rod is hinged to a second end of the second crossing rod, and a first end of the sixth crossing rod is hinged to a second end of the fourth crossing rod;

a second end of the fifth crossing rod is hinged to a second end of the sixth crossing rod;

a hinge portion between the fifth crossing rod and the sixth crossing rod is connected to a first end of the seventh crossing rod; and a second end of the first crossing rod and a second end of the third crossing rod are hinged to a second end of the seventh crossing rod; and in the first structure and the second structure, when the wagon is folded, the fixed end and the linkage end located at the same side move away from each other; and when the wagon is unfolded, the fixed end and the linkage end located at the same side approach each other.

7. The wagon according to claim 6, wherein adjacent fixed ends of each two adjacent side folding mechanisms are connected to a same top fixing element, and adjacent linkage ends of each two adjacent side folding mechanisms are connected to a same linkage sliding sleeve.

8. The wagon according to claim 1, further comprising a bottom support mechanism and a handle mechanism; wherein the bottom support mechanism is hinged between the four telescopic standing posts; a set of side folding mechanisms arranged opposite to each other are connected to the bottom support mechanism through a first connecting assembly and a second connecting assembly, respectively; and the bottom support mechanism is foldable, and a height of the bottom support mechanism after being folded is smaller than a height of each telescopic standing post;

the handle mechanism comprises a telescopic rod, a first crossbar, and a second crossbar; a first end of the first crossbar and a first end of the second crossbar are hinged to the telescopic rod, and a second end of the first crossbar and a second end of the second crossbar are respectively rotatably connected at a first limited angle to lower ends of two adjacent telescopic standing posts in one-to-one correspondence; the telescopic rod is configured to extend and retract; and a height of the telescopic rod in a retraction state is smaller than the height of each telescopic standing post; and lower ends of the four telescopic standing posts are provided with casters, and at least one pair of casters are universal wheels.

9. The wagon according to claim 8, wherein the bottom support mechanism comprises a first bottom connector and a second bottom connector; the first connecting assembly is provided with a third bottom connector; and the second connecting assembly is provided with a fourth bottom connector;

the first bottom connector is rotatably connected at a second limited angle to lower ends of two adjacent telescopic standing posts through first bottom connecting rods;

the second bottom connector is rotatably connected at a third limited angle to lower ends of other two adjacent telescopic standing posts through second bottom connecting rods;

the first bottom connector is rotatably connected at a fourth limited angle to the third bottom connector and the fourth bottom connector through third bottom connecting rods;

the second bottom connector is rotatably connected at a fifth limited angle to the third bottom connector and the fourth bottom connector through fourth bottom connecting rods; and when the wagon is in the folded state, a height of the first bottom connector and a height of the second bottom connector are smaller than the height of each telescopic standing post.

10. The wagon according to claim 1, wherein top ends of the four telescopic standing posts are respectively connected to four corners of a fabric bed of the wagon in one-to-one correspondence.

11. The wagon according to claim 4, wherein the at least two side folding mechanisms comprise four side folding mechanisms located at front, rear, left and right sides; the side folding mechanisms located at the left and right sides are constructed in a first or second structure; and the side folding mechanisms located at the front and rear sides are constructed in the first structure;

in the first structure:

the first structure comprises a plurality of X-shaped rod sets, wherein the plurality of X-shaped rod sets are sequentially hinged; and each of the plurality of X-shaped rod sets comprises a first connecting rod and a second connecting rod, wherein the first connecting rod and the second connecting rod are hinged in a central part;

in each side folding mechanism, as for an X-shaped rod set located at a head end, a first end of the first connecting rod forms the fixed end, and a first end of the second connecting rod forms the linkage end;

as for an X-shaped rod set located at a tail end, a first end of the first connecting rod forms the fixed end, and a first end of the second connecting rod forms the linkage end; and in the X-shaped rod set, the first end of the first connecting rod and the first end of the second connecting rod are located at a first same side;

in the second structure:

the second structure comprises a first crossing rod and a second crossing rod located at a first end, a third crossing rod and a fourth crossing rod located at a second end, and a T-shaped folding assembly located in a central position;

the first crossing rod and the second crossing rod are hinged in a first central part, and the third crossing rod and the fourth crossing rod are hinged in a second central part;

a first end of the first crossing rod forms the fixed end, and a first end of the second crossing rod forms the linkage end; and the first end of the first crossing rod and the first end of the second crossing rod are located at a second same side;

a first end of the third crossing rod forms the fixed end, and a first end of the fourth crossing rod forms the linkage end; and the first end of the third crossing rod and the first end of the fourth crossing rod are located at a third same side;

the T-shaped folding assembly comprises a fifth crossing rod, a sixth crossing rod, and a seventh crossing rod;

a first end of the fifth crossing rod is hinged to a second end of the second crossing rod, and a first end of the sixth crossing rod is hinged to a second end of the fourth crossing rod;

a second end of the fifth crossing rod is hinged to a second end of the sixth crossing rod;

a hinge portion between the fifth crossing rod and the sixth crossing rod is connected to a first end of the seventh crossing rod; and a second end of the first crossing rod and a second end of the third crossing rod are hinged to a second end of the seventh crossing rod; and in the first structure and the second structure, when the wagon is folded, the fixed end and the linkage end located at the same side move away from each other; and when the wagon is unfolded, the fixed end and the linkage end located at the same side approach each other.

12. The wagon according to claim 5, wherein the at least two side folding mechanisms comprise four side folding mechanisms located at front, rear, left and right sides; the side folding mechanisms located at the left and right sides are constructed in a first or second structure; and the side folding mechanisms located at the front and rear sides are constructed in the first structure;

in the first structure:

the first structure comprises a plurality of X-shaped rod sets, wherein the plurality of X-shaped rod sets are sequentially hinged; and each of the plurality of X-shaped rod sets comprises a first connecting rod and a second connecting rod, wherein the first connecting rod and the second connecting rod are hinged in a central part;

in each side folding mechanism, as for an X-shaped rod set located at a head end, a first end of the first connecting rod forms the fixed end, and a first end of the second connecting rod forms the linkage end;

as for an X-shaped rod set located at a tail end, a first end of the first connecting rod forms the fixed end, and a first end of the second connecting rod forms the linkage end; and in the X-shaped rod set, the first end of the first connecting rod and the first end of the second connecting rod are located at a first same side;

in the second structure:

the second structure comprises a first crossing rod and a second crossing rod located at a first end, a third crossing rod and a fourth crossing rod located at a second end, and a T-shaped folding assembly located in a central position;

the first crossing rod and the second crossing rod are hinged in a first central part, and the third crossing rod and the fourth crossing rod are hinged in a second central part;

a first end of the first crossing rod forms the fixed end, and a first end of the second crossing rod forms the linkage end; and the first end of the first crossing rod and the first end of the second crossing rod are located at a second same side;

a first end of the third crossing rod forms the fixed end, and a first end of the fourth crossing rod forms the linkage end; and the first end of the third crossing rod and the first end of the fourth crossing rod are located at a third same side;

the T-shaped folding assembly comprises a fifth crossing rod, a sixth crossing rod, and a seventh crossing rod;

a first end of the fifth crossing rod is hinged to a second end of the second crossing rod, and a first end of the sixth crossing rod is hinged to a second end of the fourth crossing rod;

a second end of the fifth crossing rod is hinged to a second end of the sixth crossing rod;

a hinge portion between the fifth crossing rod and the sixth crossing rod is connected to a first end of the seventh crossing rod; and a second end of the first crossing rod and a second end of the third crossing rod are hinged to a second end of the seventh crossing rod; and in the first structure and the second structure, when the wagon is folded, the fixed end and the linkage end located at the same side move away from each other; and when the wagon is unfolded, the fixed end and the linkage end located at the same side approach each other.

13. The wagon according to claim 2, wherein top ends of the four telescopic standing posts are respectively connected to four corners of a fabric bed of the wagon in one-to-one correspondence.

14. The wagon according to claim 3, wherein top ends of the four telescopic standing posts are respectively connected to four corners of a fabric bed of the wagon in one-to-one correspondence.

15. The wagon according to claim 4, wherein top ends of the four telescopic standing posts are respectively connected to four corners of a fabric bed of the wagon in one-to-one correspondence.

16. The wagon according to claim 5, wherein top ends of the four telescopic standing posts are respectively connected to four corners of a fabric bed of the wagon in one-to-one correspondence.

* * * * *